US010270750B2

(12) United States Patent
Giglio et al.

(10) Patent No.: US 10,270,750 B2
(45) Date of Patent: Apr. 23, 2019

(54) MANAGING ACCESS TO SOFTWARE BASED ON A STATE OF AN ACCOUNT

(71) Applicant: Adobe Inc., San Jose, CA (US)

(72) Inventors: Robert K. Giglio, Moraga, CA (US); Patrick Martin McLean, Seattle, WA (US); Neil Raina, Fremont, CA (US); Joshua C. King, Portland, OR (US); John A. Trammel, Bothel, WA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/583,228

(22) Filed: May 1, 2017

(65) Prior Publication Data

US 2018/0316656 A1 Nov. 1, 2018

(51) Int. Cl.
*H04L 29/06* (2006.01)
*G06Q 20/40* (2012.01)

(52) U.S. Cl.
CPC ......... *H04L 63/08* (2013.01); *G06Q 20/4014* (2013.01); *H04L 63/10* (2013.01)

(58) Field of Classification Search
None
See application file for complete search history.

(56) References Cited

U.S. PATENT DOCUMENTS

| 8,412,952 | B1 * | 4/2013 | Ramzan | G06F 21/00 713/189 |
| 8,713,161 | B2 * | 4/2014 | Shinomiya | G06F 21/10 709/203 |
| 9,747,621 | B1 * | 8/2017 | Kuruvila | G06Q 30/04 |
| 2002/0032664 | A1 * | 3/2002 | Ikuta | G06Q 20/123 705/73 |
| 2003/0097340 | A1 * | 5/2003 | Okamoto | G06F 21/10 705/65 |
| 2004/0139026 | A1 * | 7/2004 | Harada | G06F 21/10 705/51 |
| 2005/0097543 | A1 * | 5/2005 | Hirayama | G06F 8/65 717/168 |
| 2009/0265249 | A1 * | 10/2009 | Bishop | G06Q 20/02 705/21 |
| 2010/0251389 | A1 * | 9/2010 | Mizutani | G06F 21/10 726/30 |
| 2011/0004516 | A1 * | 1/2011 | Oved | G06Q 30/02 705/14.39 |

(Continued)

*Primary Examiner* — Michael R Vaughan
(74) *Attorney, Agent, or Firm* — Keller Jolley Preece

(57) ABSTRACT

The present disclosure is directed towards systems and methods for using a software as a service ("SaaS") product. The systems and methods request, in response to receiving a request to purchase a software as a service product, a user identifier. Additionally, in response to receiving the user identifier, the systems and methods enable a completed purchase of the SaaS product with a provisional account associated with the user identifier. Furthermore, the systems and methods prevent use of the software as a service product through the provisional account and, in response to a completed purchase of the software as a service product, request a creation of a user credential. Upon receiving the user credential, the systems and methods convert the provisional account into a permanent account associated with the user identifier and user credential and enable use of the SaaS product through the permanent account.

20 Claims, 16 Drawing Sheets

(56) References Cited

U.S. PATENT DOCUMENTS

| | | | | |
|---|---|---|---|---|
| 2012/0102008 A1* | 4/2012 | Kaariainen | ............ | H04W 4/21 |
| | | | | 707/705 |
| 2012/0317621 A1* | 12/2012 | Mihara | ............... | G06F 21/6218 |
| | | | | 726/4 |
| 2013/0132247 A1* | 5/2013 | Shimogawa | ........... | G06Q 30/04 |
| | | | | 705/34 |
| 2013/0346297 A1* | 12/2013 | Zuck | ....................... | G06Q 30/04 |
| | | | | 705/39 |
| 2014/0012739 A1* | 1/2014 | Wall | .................... | G06Q 20/383 |
| | | | | 705/39 |
| 2014/0123240 A1* | 5/2014 | Seo | ..................... | H04L 63/0807 |
| | | | | 726/4 |
| 2014/0143136 A1* | 5/2014 | Dhar | ...................... | G06Q 20/10 |
| | | | | 705/39 |
| 2014/0143151 A1* | 5/2014 | Dhar | ...................... | G06Q 20/10 |
| | | | | 705/44 |
| 2014/0149466 A1* | 5/2014 | Sato | .................. | G06F 17/30289 |
| | | | | 707/803 |
| 2014/0223570 A1* | 8/2014 | Matsushima | ......... | G06F 21/105 |
| | | | | 726/26 |
| 2015/0154588 A1* | 6/2015 | Purves | ................. | G06Q 20/363 |
| | | | | 705/14.27 |
| 2015/0339668 A1* | 11/2015 | Wilson | ................. | G06Q 20/401 |
| | | | | 705/41 |
| 2016/0125174 A1* | 5/2016 | Matsushima | .......... | G06Q 10/10 |
| | | | | 726/30 |

\* cited by examiner

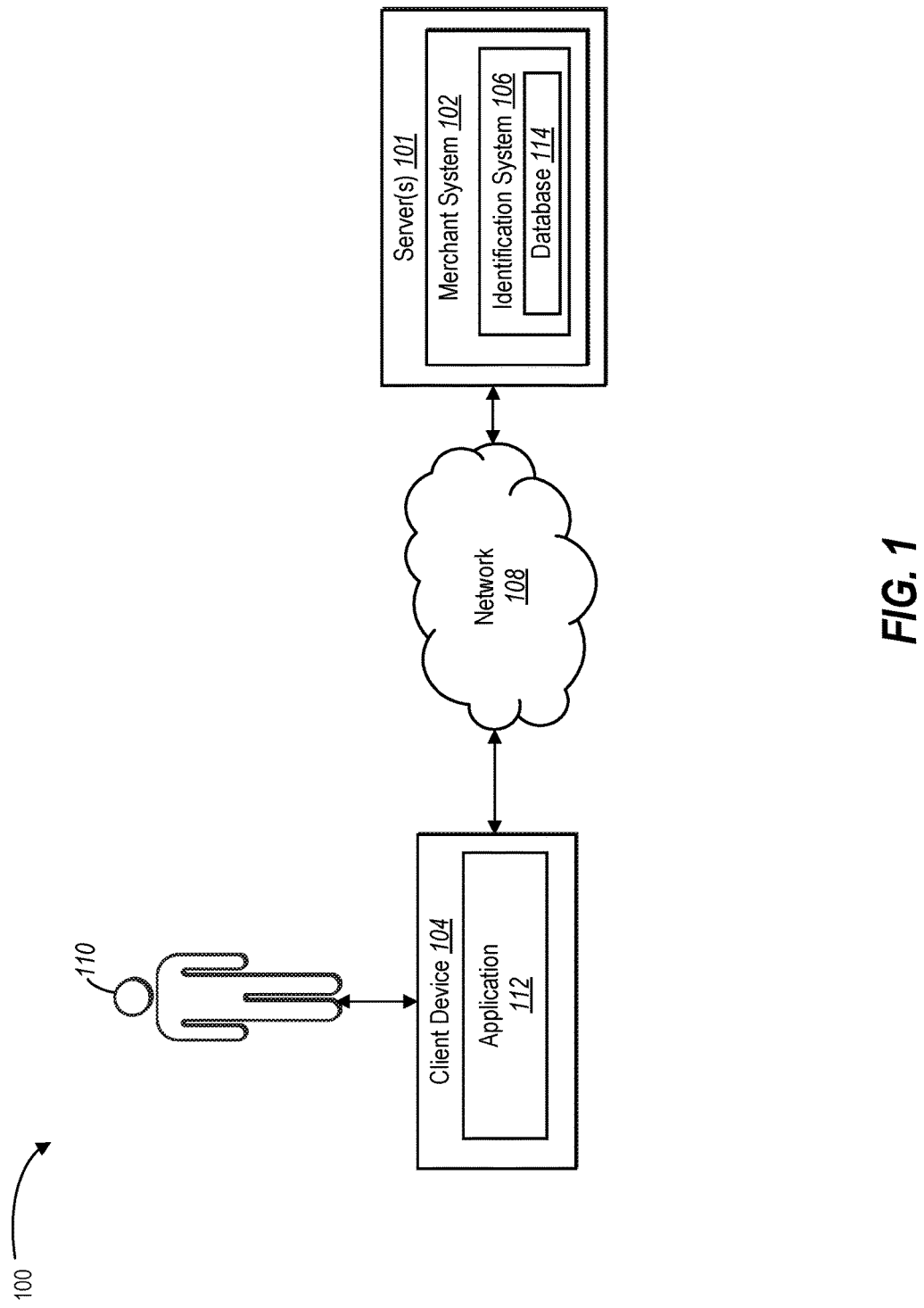

MANAGING ACCESS TO SOFTWARE BASED ON A STATE OF AN ACCOUNT

BACKGROUND

The Internet has played an influential role in developing electronic commerce. Many businesses have established websites to promote their products to potential consumers. Typically, the website includes a user interface that allows consumers to select items they wish to purchase and place them into a virtual shopping cart while they continue to browse. After the consumer has completed browsing and/or selecting other items on the website and is ready to "checkout," the consumer completes the ordering process to purchase the items. Conventionally, during the checkout phase, the website directs the consumer to another web page (e.g., a checkout page) where the consumer provides payment information. Furthermore, typically, the web site requires a user to login to the web site and/or create an account with the web site in order to complete a purchase.

By requiring a consumer to login and/or create an account with a merchant website, the checkout process can be time extensive and can provide friction between the consumer and the merchant (e.g., requiring a user to create a username, password, provide payment information, address, etc.). This is especially true with mobile devices, which present more difficulty in creating usernames and passwords. As a result, in some instances, having to login and/or create an account prior to making a purchase with the merchant website can inhibit (e.g., deter and/or prevent) purchases from the consumer. Some attempts to mediate the above issues include guest checkout services, which allow a consumer to purchase a product from a merchant website without having to create an account with the merchant website.

However, such guest checkout services fail to provide adequate solutions when dealing with software as a service (SaaS) products (e.g., products such as software licensed on a subscription basis and centrally hosted), which typically require login credentials (e.g., an account and/or authentication) to operate and use the SaaS products. Additionally, such SaaS products conventionally require an account with the merchant system providing (e.g., hosting) the SaaS products, which guest checkout services do not require. Furthermore, the merchants providing such SaaS products typically require email verification to determine correct pricing, corporate accounts, shared licenses, permissions, etc. that guest checkout services do not require.

Accordingly, these and other disadvantages exist with respect to conventional systems.

BRIEF SUMMARY

The various embodiments described below provide benefits and/or solve one or more of the foregoing or other problems in the art with systems and methods for providing software products to a user in a streamlined process that defers the need for users to create a full user account (e.g., setting a password) prior to making a purchase. In particular, the systems and methods enable a user to purchase a product without creating a username and password combination. In one or more embodiments, the systems and methods create a provisional account for the user and enable the user to purchase a software product (e.g., a SaaS product) using the provisional account without creating a full user account. Moreover, upon a completed purchase of the software product, the systems and methods require the user to create a full user account prior to enabling use of the purchased software product. In response to the user creating a username and password combination, the systems and methods convert the provisional account to a permanent account. Accordingly, the systems and methods avoid at least some of the friction associated with conventional purchase processes of software products.

Additional features and advantages of the embodiments will be set forth in the description that follows, and in part will be obvious from the description, or may be learned by the practice of such example embodiments. The features and advantages of such embodiments may be realized and obtained by means of the instruments and combinations particularly pointed out in the appended claims. These, and other features, will become more fully apparent from the following description and appended claims, or may be learned by the practice of such example embodiments as set forth hereinafter.

BRIEF DESCRIPTION OF THE DRAWINGS

Various embodiments will be described and explained with additional specificity and detail through the use of the accompanying drawings in which:

FIG. 1 illustrates a schematic representation of an environment within which merchant system can operate in accordance with one or more embodiments of the present disclosure;

DETAILED DESCRIPTION

Figure 2A:
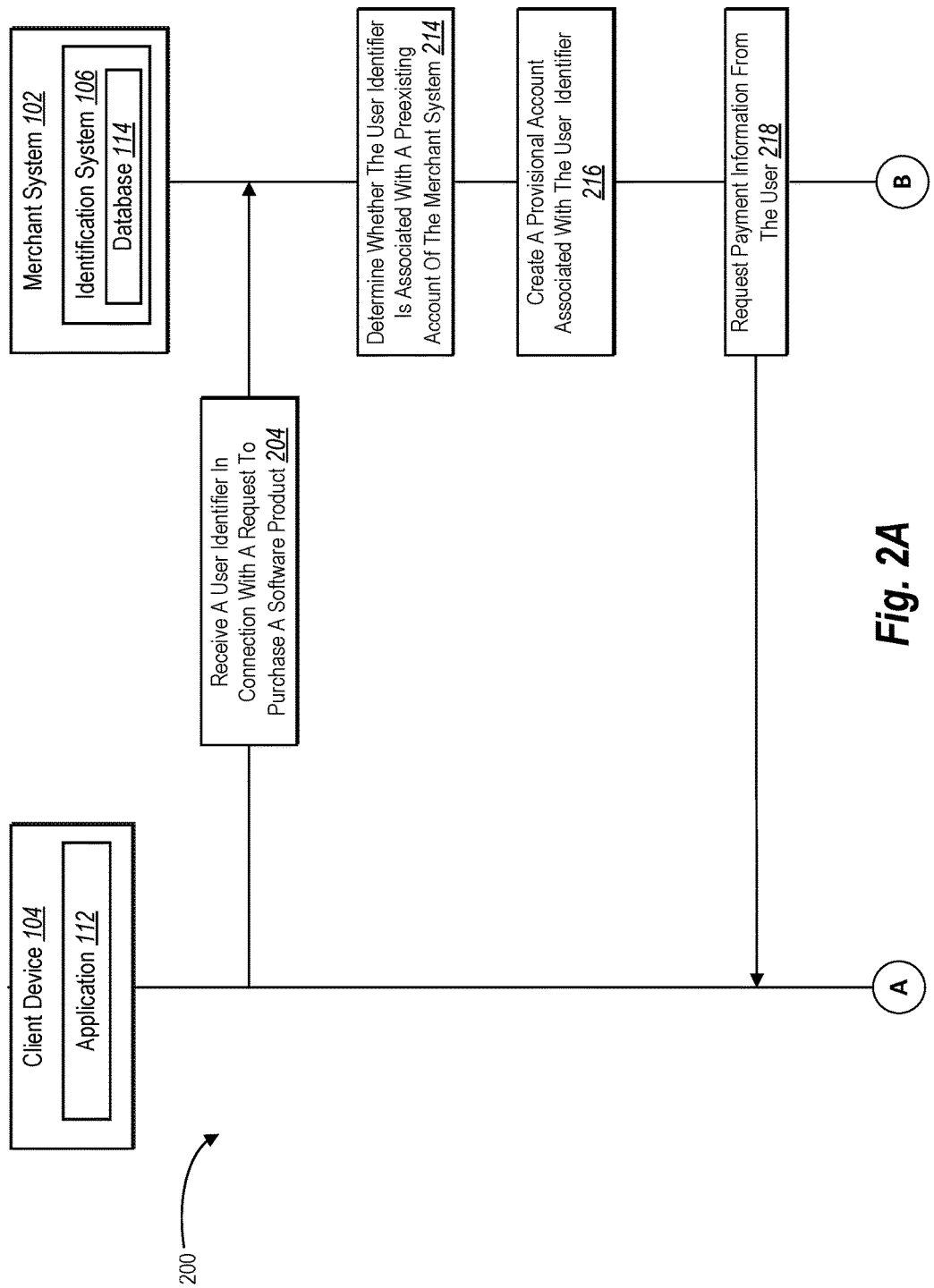
FIGS. 2A-2D illustrate a sequence flow diagram that a merchant system can utilize to enable use of a product in accordance with one or more embodiments.

The various embodiments described herein provide a merchant system for providing software products to a user in a streamlined process that defers the need for users to create a full user account (e.g., setting a password) prior to making a purchase. In particular, in one or more embodiments, the merchant system creates a provisional account for the user and enables the user to purchase a software product (e.g., a SaaS product) using the provisional account without setting a password. Prior to enabling use of the purchased software product, the merchant system requires the user to provide a password, with which the merchant system converts the provisional account into a permanent account. The merchant system then enables use of the purchased software product in connection with the permanent account.

As noted above, in some embodiments, the merchant system enables a user to purchase but not use a SaaS product via a provisional account, which only requires a user to input a user identifier (e.g., username). For example, in response to receiving a request to purchase a SaaS product, the merchant system can request a user identifier (e.g., user name) from the user. Furthermore, in response to receiving the user identifier from the user, the merchant system can determine whether the user identifier is associated with a preexisting account of the merchant system. Moreover, upon determining that the user identifier is not associated with a preexisting account of the merchant system, the merchant system can create a provisional account of the merchant system, which enables the user to purchase the SaaS product without creating a user identifier and user credential (e.g., username and password) combination. However, as noted above, the provisional account does not permit a user to use the SaaS product without performing an additional claiming action (e.g., verifying an email, creating a password, etc.)

Because the merchant system enables the user to purchase the SaaS product via a provisional account while only requiring a user identifier, the merchant system provides a quick, efficient, and more simplified checkout process for a user in comparison to conventional systems. Furthermore, because the merchant system provides a more simplified checkout process, the merchant system reduces friction between the user and the merchant system during a checkout process in comparison to conventional systems. As a result, the merchant system provides a more suitable checkout process for mobile devices in comparison to conventional systems. Moreover, as will be appreciated by one or ordinary skill in the art, by simplifying the checkout process, the merchant system of the present disclosure may provide a more enjoyable experience for new users, which, in turn, results in increased sales and revenue.

As mentioned briefly above, the merchant system enables a user to use the SaaS product via a permanent account, which requires a user to input both a user identifier and a user credential. For example, the merchant system can enable the purchase of the SaaS product through the provisional account and, then, the merchant system can require the user to perform a claiming action in order to use the purchase SaaS product. For instance, the merchant system can require the user to create a user credential (e.g., password) and/or verify an email address (e.g., create a permanent account with the merchant system). In particular, upon facilitating a purchase of the SaaS product via the provisional account, the merchant system can provide a communication to the user (e.g., via a client device) instructing the user to create a user credential. Furthermore, until the user completes the claiming action, the merchant system can prevent the user from using (e.g., downloading and/or operating) the SaaS product. Because the merchant system enables the user to purchase the SaaS product via a provisional account while only requiring a user identifier but requires the user to complete a claiming action before using the product, the merchant system simplifies the checkout process while still requiring needed information for using the SaaS product (e.g., an established account with the merchant system).

Furthermore, because the merchant system of the present disclosure provides SaaS products to a user in a streamlined process while still acquiring required credentials to use the SaaS products, as described above, the merchant system provides improvements in the performance of a computer system. For example, because the merchant system only requires a user identifier instead of requiring a user identifier and a user credential (e.g., a full login) during a checkout process, the merchant system reduces required processing power, memory, etc. Therefore, the merchant system reduces required processing power, memory, and communication resources needed to facilitate purchasing processes. Accordingly, the merchant system results in less data transfer and data bandwidth usage for a computer/communication system. In other words, the merchant system results in less required processing power and communication bandwidth in comparison to conventional systems. As a result, the merchant system of the present disclosure, in comparison to conventional systems, is a more appropriate system for mobile devices.

As used herein, the term "provisional account" refers to an account with the merchant system (e.g., an established digital relationship between a user and the merchant system) that permits a user to purchase a product (e.g., a service, a software product, etc.) from the merchant system but does not enable use of the product. As used herein the term "use" when used in connection with a product of the merchant system can refer to one or more of operating the product (e.g., operating a software product) and downloading the product (e.g. downloading a software product). For example, a provisional account refers to an account with the merchant system that does not allow full use of a product of the merchant system. In some instances, the provisional account can be designated as provisional (e.g., can be in a provisional state) via an assigned status identifier within an identification system.

As used herein, the term "permanent account" or "full user account" refers to an account with the merchant system that permits a user to purchase a product and enables use of a purchased product through the permanent account. As is discussed in greater detail below, in some instances, the use may be limited, and in other instances, the use may be complete depending on how the permanent account was created. In some instances, the permanent account can be designated as permanent (e.g., can be in a permanent state) via an assigned status identifier within an identification system.

To provide some of the benefits discussed above, one or more embodiments of the merchant system include an identification system that maintains a status of user accounts. In particular, the identification system maps user identifiers to account statuses (e.g., provisional or permanent). As mentioned above, provisional and permanent accounts each have different levels of permissions (e.g., access to software product use or not). Each time a user enters a user identifier into a product/application/website associated with the merchant system, the merchant system queries the identification system to verify a status of any account associated with the user identifier. If the status is provisional, prevents use of one or more software products until the account is converted into a permanent account. Furthermore, upon identifying an account as a provisional account, the merchant system can prompt the user to perform a claiming process (e.g., providing a password) in order to convert the provisional account into a permanent account. The identification system is remote from the client device. As such, the merchant system can verify or monitor any use of an account associated with the user identifier irrespective of the device or browser session using the user identifier. Furthermore, because the merchant system creates the provisional account and associates the provisional account with the user identifier (e.g., creates a basic account associated for the user), the claiming action can be performed from a different client device and/or during a different browsing session (i.e., web browser session) by providing the user identifier. In other words, the individual actions of purchasing the SaaS product (e.g., creating a provisional account associated with the user identifier) and creating a permanent account associated with the purchase and the user identifier are client device and/or browsing session agnostic. As a result, the merchant system is advantageous over conventional purchasing systems (e.g., guest checkouts), which are typically browsing session specific, and as a result, are client device specific.

FIG. 1 illustrates a schematic diagram of an environment 100 in which a merchant system can operate according to one or more embodiments of the present disclosure. As illustrated, the environment 100 includes a client device 104, at least one server 101 including a merchant system 102, and a network 108. The merchant system 102 and the client device 104 can communicate via the network 108. The network 108 may include one or more networks, such as the Internet, and can use one or more communications platforms or technologies suitable for transmitting data and/or communication signals. Although FIG. 1 illustrates a particular arrangement of the client device 104, the server 101, and the network 108, various additional arrangements are possible. For example, the server 101 and, accordingly, the merchant system 102, can directly communicate with the client device 104, bypassing the network 108.

As illustrated in FIG. 1, a user 110 can interface with the client device 104, for example, to communicate with the server 101 and to utilize the merchant system 102 to purchase and use a product such as a software as a service ("SaaS") product (referred to hereinafter as a "product"). The user 110 can be an individual (i.e., human user), a business, a group, or any other entity. Although FIG. 1 illustrates only one user 110 associated with the client device 104, the environment 100 can include any number of a plurality of users that each interact with the environment 100 using a corresponding client device.

In some embodiments, the merchant system 102 can include a system associated with an entity such as a service provider, which provides goods and/or services to customers (e.g., user 110). In one or more embodiments, the merchant system 102 can provide products for purchase over the Internet via one or more websites or native applications using a client device (e.g., via the client device 104). As is discussed in greater detail below, in some embodiments, the products can include software (e.g., SaaS), videos, images, access to software (e.g., licenses), access to databases, etc. Furthermore, in some embodiments, the merchant system 102 can host the products. In some embodiments, the merchant system 102 may have physical retail locations in addition to one or more websites.

Additionally, the merchant system 102 can manage access to the products offered and sold by the merchant system 102. For example, the merchant system 102 can allow users to purchase products without requiring the user to fully create an account with the merchant system 102 (e.g., without creating a username and password). However, as will be discussed in greater detail in regard to FIGS. 2A-2D, the merchant system 102 can require a user to fully create an account (e.g., a combination of a username and password) in order to utilize a purchased product from the merchant system 102. For example, the merchant system 102 can verify whether an account of the user has sufficient permissions (e.g., is the right type of account) to use a product after purchasing the product.

As illustrated, in some embodiments, the merchant system 102 can include an identification system 106 having a database 114. As is described in greater detail below in regard to FIGS. 2A-2E, the merchant system 102 can utilize (e.g., query) the identification system 106 when determining whether to provide access to a product for a given user. In some embodiments, the merchant system 102 can include an API gateway. Furthermore, the API gateway can provide access control (i.e., filtering traffic such that only authenticated and/or authorized traffic access the merchant system 102) and/or security filtering between the merchant system 102 and the identification system 106. For example, as is discussed in greater detail below, in some embodiments, the merchant system 102 can query the identification system 106 (via the API gateway) to determine, based on a provided user identifier, whether a user has a provisional account (e.g., a limited account) with the merchant system 102 or a permanent account with the merchant system 102.

Furthermore, although the identification system 106 is illustrated as being part of the merchant system 102, the disclosure is not so limited. Rather, in some embodiments, the identification system 106 can be separate from the merchant system 102. For example, the identification system 106 can be located on separate servers and/or can be associated with a third-party system.

In some embodiments, the client device 104 includes a client application 112 installed thereon. In some embodiments, the client application 112 can be associated with the merchant system 102. For example, the client application 112 allows the client device 104 to directly or indirectly interface with the merchant system 102. The client application 112 also enables the user 110 to purchase and/or access products via the merchant system 102 and the client device 104 to receive (e.g., download products) to the client device 104. For example, the client application 112 can include a web browsing application and/or a native application.

Both the client device 104 and the server 101 can represent various types of computing devices with which users can interact. For example, the client device 104 and/or the server 101 can be a mobile device (e.g., a cell phone, a smartphone, a PDA, a tablet, a laptop, a watch, a wearable device, etc.). In some embodiments, however, the client device 104 and/or server 101 can be a non-mobile device (e.g., a desktop or server). Additional details with respect to the client device 104 and the server 101 are discussed below with respect to FIG. 7.

FIGS. 2A-2D illustrate a sequence-flow diagram 200 that a merchant system 102 can utilize to enable a purchase of a product (e.g., a SaaS product) through a provisional account and requiring a creation of a permanent account to use the product. The client device 104 and merchant system 102 shown in FIGS. 2A-2D may be example embodiments of the client device 104 and merchant system 102 described in regard to FIG. 1.

A client device 104 can detect one or more user interactions requesting to purchase a product from a merchant system 102. For instance, the client device 104 can detect a user interaction requesting to purchase a product via the client application 112 (e.g., a web browsing application displaying a store front of the merchant system 102). For example, the client application 112 (e.g., a web browser and/or application specific to the merchant system) can detect the user interaction requesting to purchase a product. In one or more embodiments, the user interaction may include an interaction with a "buy now" button or other user input that is part of a purchasing work flow. In additional embodiments, the user interaction may include adding a product to an electronic cart of a website associated with the merchant system 102 and proceeding to checkout page of the website. As used herein, the terms "user interaction" mean a single interaction, or combination of interactions, received from a user by way of one or more input devices (e.g., a touch screen display, a keyboard, a mouse, etc.) of the client device 104. Furthermore, the user interaction may include one or more of clicking, tapping, or otherwise selecting elements (e.g., letters and/or characters) to request to purchase a product. As noted above, in one or more embodiments, the product may include one or more of a SaaS product, a video, an audio file, an image, access to software (e.g., licenses), etc. Furthermore, the product can include access to databases such as, for example, image and/or video databases.

In connection with a request to purchase a product, the client application 112 requests a user identifier from the client device. In some embodiments, the application 112 can request a user identifier including one or more of an email address, a username, a login credential, etc. Furthermore, in some embodiments, the request for the user identifier can include a request to create (e.g., choose, select, assign, etc.) a user identifier. In one or more embodiments, the client application 112 can request the user identifier via a web browser and/or a native application specific to the merchant system. For example, the client application 112 can request the user identifier during a checkout process of the user with the merchant system 102.

The client device 104 displays the request to the user 110. For example, the client device 104 can display the request within the client application 112. For instance, the client application 112 can display the request as a message and a corresponding input area within a graphical user interface ("GUI") of client application 112 and/or the merchant system 102 (e.g., a GUI of the checkout process of the merchant system 102).

As shown in FIG. 2A, the merchant system 102 receives the user identifier in act 204. For example, upon detecting the user interaction inputting the user identifier, the client device 104 and/or the client application 112 can provide the user identifier (e.g., a data package including the user identifier) to the merchant system 102. In one or more embodiments, the merchant system 102 can receive the user identifier through the network 108.

In response to receiving the user identifier, as illustrated in FIG. 2A, the merchant system 102 determines whether the user identifier is associated with a preexisting account of the merchant system. For example, the merchant system 102 can query (e.g., via an API call) the identification system 106 to determine whether the user identifier is associated with a preexisting provisional account or a permanent account of the merchant system 102. In some embodiments, the identification system 106 can query the database 114 to determine whether the user identifier is associated with a preexisting account of the merchant system 102. For instance, the merchant system 102 can query the identification system 106, which, in turn, can compare the received user identifier with user identifiers associated with preexisting accounts of the merchant system 102 within the database 114. The identification system 106 can communicate with the merchant system 102 as to whether the user identifier is associated with a preexisting account.

If the merchant system 102 determines that the user identifier is associated with a preexisting permanent account, as is discussed in greater detail below in regard to FIG. 4, the merchant system 102 can request that the user input a user credential (e.g., ask for a password) associated with the user identifier. For example, the merchant system 102 can require the user to login into the merchant system 102 via the user identifier and user credential.

If the merchant system 102 determines that the user identifier is associated with a preexisting provisional account, as is discussed in greater detail below in regard to FIG. 4, the merchant system 102 can provide instructions to the user on how to create a user credential (e.g., set a password). For example, the merchant system 102 can provide instructions within a client application GUI and/or a merchant system GUI on how to create a user credential (e.g., set a password). As is discussed in greater detail below, in some embodiments, the instructions can direct the user to create a user credential through a link in a previously sent email. In other embodiments, the instructions can direct the user to create a user credential within the client application GUI and/or the merchant system GUI (e.g., within the current web browsing session). In yet other embodiments, the instructions can provide an option to resend the previously sent email with instructions. Regardless, the merchant system 102 requires the user to create a user credential prior to providing access to (e.g., use of) a purchased product.

If the merchant system 102 determines that the received user identifier is not associated with a preexisting account of the merchant system, the merchant system 102 creates a provisional account of the merchant system 102 associated with the user identifier, as shown in act 216 of FIG. 2A. In one or more embodiments, the merchant system 102 can communicate with the identification system 106, and the identification system 106 can create the provisional account within the database 114 of the merchant system 102. In some embodiments, the merchant system 102 can create the provisional account by creating a data package establishing (e.g., defining) a provisional relationship between the user and the merchant system 102 and associating the user identifier with the data package within the database 114 of the identification system 106. For example, the provisional account can allow a user to purchase a product while denying use of the product.

As mentioned above, the merchant system 102 creates a provisional account that enables (e.g., permits) a user to purchase a product through the provisional account without requiring a creation of a user credential (e.g., password). For example, the provisional account can be in a state that does not allow (e.g., enable) a user credential (e.g., password) to be entered during a purchase process or a login attempt.

Furthermore, as noted above, the merchant system 102 creates the provisional account such that the provisional account is not be capable of utilizing (i.e., using) a purchased product of the merchant system. For instance, in some embodiments, when creating the provisional account, the merchant system 102 can associate a provisional identifier with the provisional account within the database 114 of the identification system 106. In other words, the merchant system 102 can tag (e.g., mark or label) the provisional account with the provisional identifier (e.g., tag) within the database 114 of the identification system 106. Furthermore, based on the provisional identifier of the provisional account, the merchant system 102 may not allow a user credential to be entered during a login attempt and may not allow use of the product through the provisional account. As will be discussed in greater detail below, the provisional account requires a user to perform additional actions (e.g., claiming actions) to create a permanent account and to create a user credential in order to use the purchased product.

In some embodiments, creating the provisional account can further include reserving the received user identifier for the provisional account within the database 114 of the identification system 106. Furthermore, the merchant system 102 can create a data package associated with the user identifier that defines the access of the provisional account of the user and can store the data package within the database 114 of the identification system 106.

Referring again to act 214 of FIG. 2A, although the merchant system is described herein as determining whether a user identifier is associated with a preexisting account within a purchase process (e.g., acts 204-212 of FIG. 2A), the disclosure is not so limited. Rather, for example, the merchant system 102 can determine whether a user identifier received via a login attempt (e.g., a login attempt to the merchant system 102) is associated with a preexisting account.

In addition to creating a provisional account associated with the user identifier, the merchant system 102 requests payment information from the user, as shown in act 218 of FIG. 2A. For example, in some embodiments, the merchant system 102 can request payment card information, an address associated with the payment card, etc. In additional embodiments, the merchant system 102 can request credentials for an online payment service (e.g., PAYPAL, GOOGLE WALLET, etc.). Requesting the payment information from the user is described in greater detail below in regard to FIGS. 3C and 3D.

Upon receiving the request for payment information, the client application 112 and/or client device 104 detects a user interaction inputting payment information. For example, the client application 112 of the client device 104 detects a user interaction inputting payment card details and/or online payment service credentials within the client application 112 (e.g., the client application GUI). The client device 104 detecting a user interaction inputting payment information is described in greater detail below in regard to FIGS. 3C and 3D.

Figure 2B:
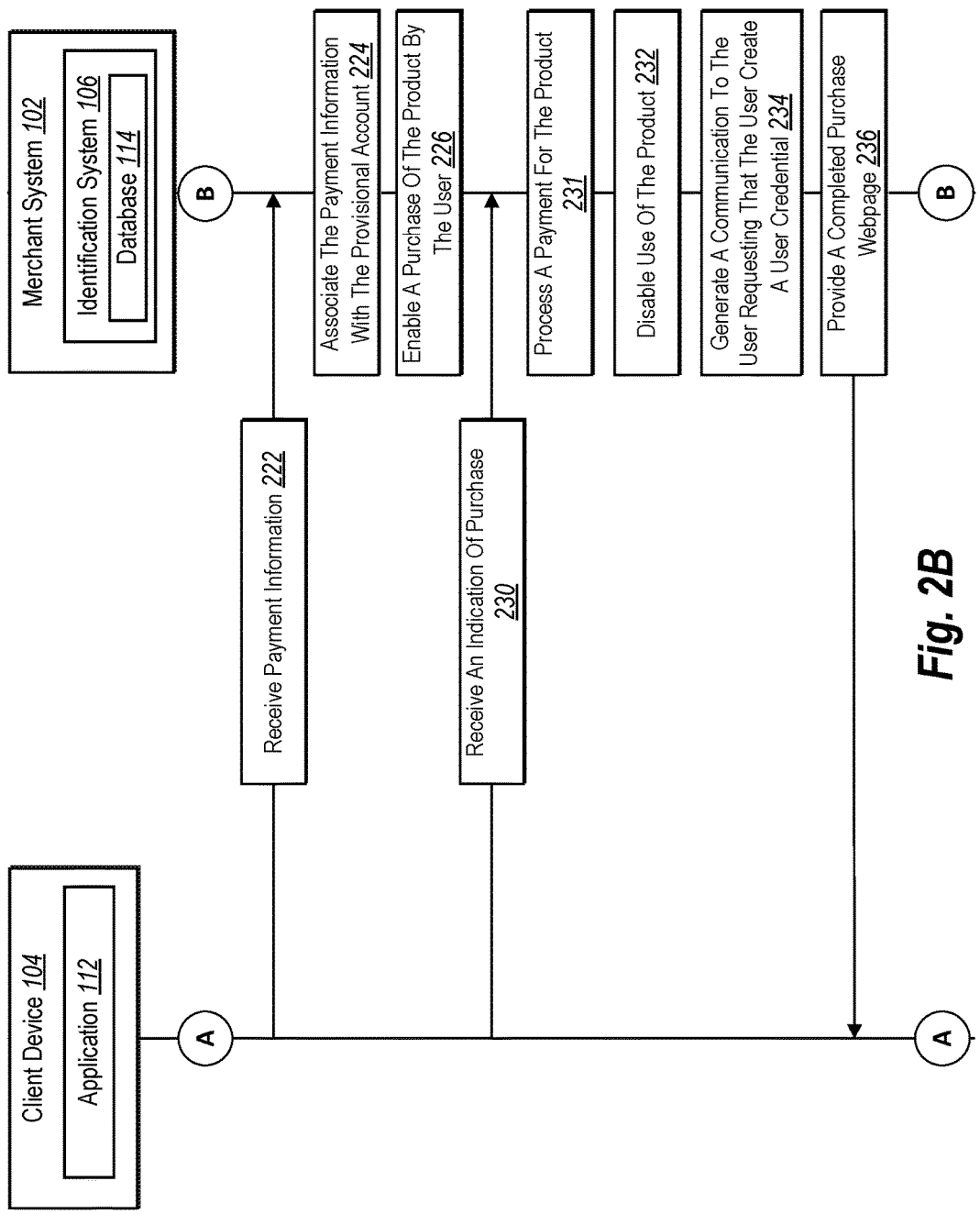

As shown in FIG. 2B, upon the client device 104 detecting the user interaction inputting the payment information, the merchant system 102 receives the payment information, as shown in act 222. For example, upon detecting the user interaction inputting the payment information, the client device 104 and/or the client application 112 can provide the payment information (e.g., a data package including the payment information) to the merchant system 102. In one or more embodiments, the merchant system 102 can receive the payment information through the network 108.

Although the merchant system 102 is described herein as requesting and receiving payment information after creating the provisional account associated with the user identifier, the disclosure is not so limited. For example, in some embodiments, the merchant system 102 can request the payment information and can receive the payment information prior to creating the provisional account associated with the user identifier. For instance, the merchant system 102 can request the payment information upon determining that the user identifier is not associated with the preexisting account of the merchant system 102.

Regardless, in response to receiving the payment information, as illustrated in FIG. 2B, the merchant system 102 associates the payment information with the provisional account associated with the user identifier, as shown in act 224. For instance, the merchant system 102 can create a data package including the payment information (e.g., payment card details, online payment service details, etc.) and can associate the payment information with the provisional account associated with the user identifier within the database 114 of the identification system 106.

In some embodiments, upon receiving the payment information, the merchant system 102 can further perform an Address Verification Service (AVS) check (e.g., compare a numerical portion of the cardholder's billing address (street number and ZIP code) against information in a payment card issuing bank's databases) and a Card Security Code (CVV) check (e.g., verifying that an input 3- or 4-digit number is correct) as a fraud prevention measure. In some embodiments, the merchant system 102 can perform the fraud prevention measure prior to creating the provisional account.

Upon receiving the payment information and associating the payment information with the provisional account, the merchant system 102 enables (e.g., authorizes) a purchase of the product by the user through the provisional account, as show in act 226 of FIG. 2B. For example, the merchant system 102 enables a user to interact with a selectable element (e.g., a confirm purchase button) to initiate and/or complete a purchase of the product.

In response to the merchant system 102 enabling a purchase of the product, the client application 112 and/or client device 104 detects a user interaction causing a purchase of the product. For example, the client application 112 of the client device 104 detects a user interaction selecting a selectable element (e.g., a confirm purchase button) to initiate and/or complete the purchase of the product. The client device 104 detecting a user interaction causing a purchase of the product is described in greater detail below in regard to FIGS. 3D and 3E.

As shown in FIG. 2B, upon the client device 104 detecting the user interaction causing a purchase of the product, the merchant system 102 receives an indication of the purchase, as shown in act 230. For example, upon detecting the user interaction causing a purchase of the product, the client device 104 and/or the client application 112 can provide an indication of the purchase to the merchant system 102. In one or more embodiments, the merchant system 102 can receive the indication of the purchase through the network 108.

In response to receiving the indication of the purchase through the provisional account, as illustrated in FIG. 2B, the merchant system 102 processes a payment for the product, as shown in act 231. For example, the merchant system 102 can process the payment for the product according to the payment information provided to the merchant system in act 222 of FIG. 2B. In some embodiments, the merchant system 102 can process the payment through a payment gateway (e.g., software and servers for transmitting transaction information to acquiring banks and responses from issuing banks (such as whether a transaction is approved or declined)). For example, the payment gateway can implement Payment Card Industry Data Security Standard (PCI-DSS or PCI).

Upon processing the payment for the product, the merchant system 102 can associate the purchase with the provisional account. For example, the merchant system 102 can create a data package indicating the purchase product and can associate the data package with the provisional account such that the provisional account indicates that the user purchased the product and has rights to the purchased product.

Furthermore, upon processing the payment for the product, as illustrated in FIG. 2B, the merchant system 102 disables (e.g., blocks) use of the purchased product by the user, as shown in act 232. For example, the merchant system 102 blocks operation of the product (e.g. operation of a software product) in connection with the provisional account and blocks (e.g., prevents) any downloads of the product (e.g., downloads of the software product). In particular, the merchant system 102 can block use of the product in connection with the provisional account. For instance, as mentioned above, purchased products may not be usable via a provisional accounts of the merchant system 102. In some embodiments, the merchant system 102 blocks use of the product merely via the assigned provisional state of the provisional account of the user (due to the provisional identifier) within the database 114 of the identification system 106. As will be discussed in greater detail below, the merchant system can block use of the purchase product until the user completes a claiming action (e.g., creating or setting a user credential/password).

In some embodiments, in response to processing the payment for the product (e.g., completing the purchase of the product), the merchant system 102 can issue a limited use access token. For example, the merchant system 102 can issue a limited use access token specific to a current web browsing session (e.g., the web browsing session within which the product was purchased). The limited use access token can provide access to some services of the merchant system 102. For example, the limited use access token can provide access to purchase details, product details, etc. However, the limited use access token does not provide access to the purchased product (e.g., use of the purchase product).

Additionally, in response to processing the payment for the product (e.g., completing the purchase of the product), as illustrated in FIG. 2B, the merchant system 102 generates a communication to the user requesting that the user create a user credential (e.g., a password), as shown in act 234. For example, the merchant system 102 can generate a communication to the user requesting that the user complete a creation of a permanent account with the merchant system 102. In some embodiments, the merchant system 102 can generate a communication to the user requesting that the user verify an email address (e.g., a user identifier) and create a password. In some embodiments, the merchant system 102 can generate a preset communication stored on the database 114. In additional embodiments, the merchant system 102 can generate the communication via a natural language generator system.

In some embodiments, the communication can include an email to the user (e.g., addressed to the user identifier) having a link within the email for verifying the email address and for creating (e.g., choosing) a user credential (e.g., password). In such embodiments, the email can include a message requesting that the user verify the email address and to create a user credential. For example, the email may include a message such as, "Click below to confirm your account and create a password." Generating a communication including an email is described in further detail below in regard to FIG. 3F.

In additional embodiments, the communication can include a notification within the client application 112 having a link for creating a user credential. For example, the communication can include notification (e.g., option) on a purchase confirmation web page. In such embodiments, the notification can include a message requesting that the user create a user credential (e.g., password). For example, the notification can include a message such as "Set your password to sign in to get started" and a selectable link to set the password. As noted above, in some embodiments, the merchant system 102 can adjust a preset communication (e.g., a preset notification) stored on the database 114. For example, the merchant system 102 can address the preset communication to the user based on the received user identifier and/or payment information. In additional embodiments, the merchant system 102 can generate the communication via a natural language generator system based on the received user identifier and/or payment information. Generating a communication including a notification within a confirmation page is described in further detail below in regard to FIG. 3E.

Figure 2C:
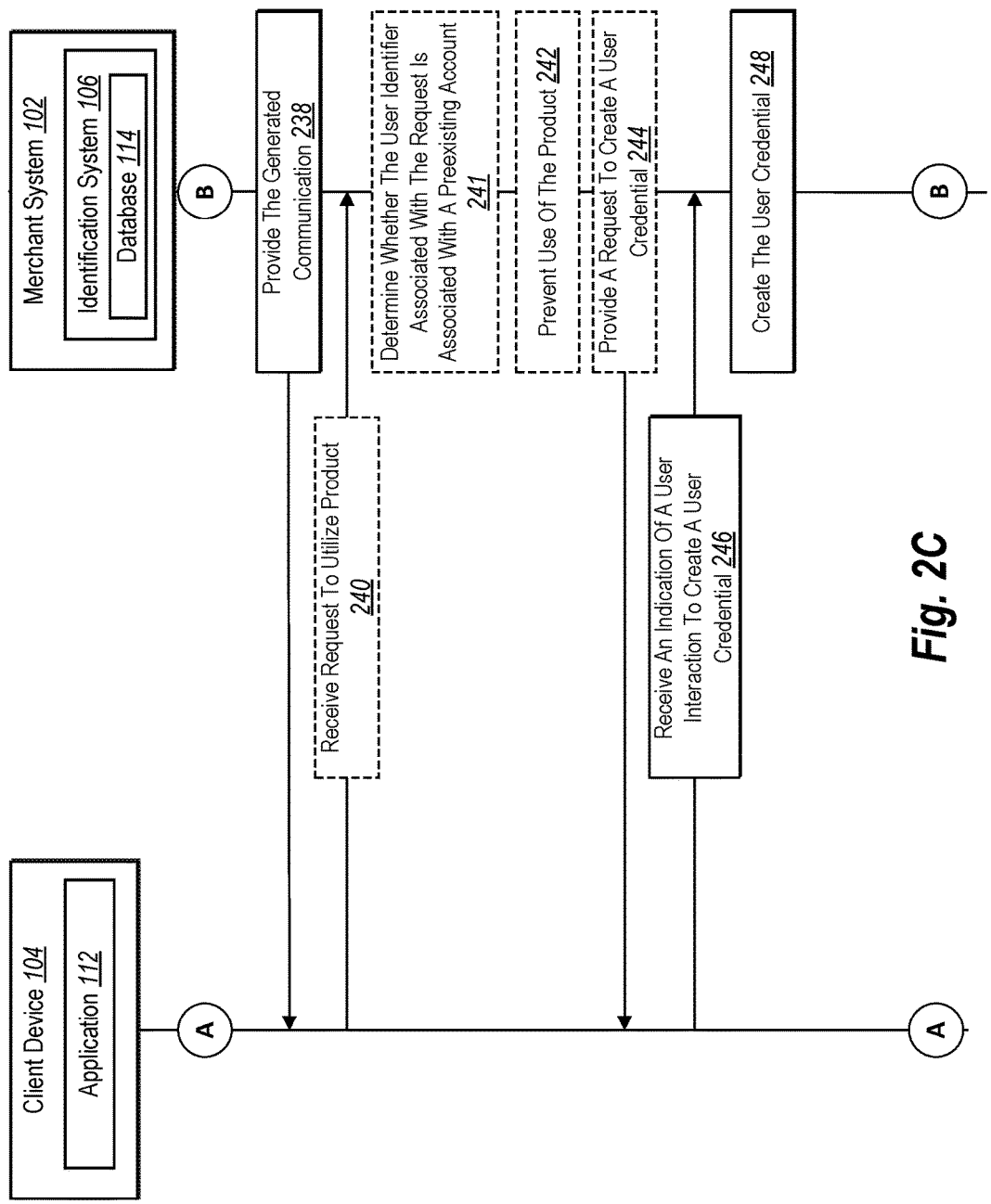

Upon generating the communication to the user requesting that the user create a user credential, the merchant system 102 provides a completed purchase confirmation to the client device 104, as shown in act 236 of FIG. 2C. For instance, the merchant system 102 can provide a completed purchase webpage to the client device 104 and/or client application 112 for display to the user 110. In some embodiments, the completed purchase webpage includes an indication of the of the communication generated in act 234 of FIG. 2B.

Additionally, upon generating the communication to the user requesting that the user create a user credential, the merchant system 102 provides the generated communication to the client device 104, as shown in act 238 of FIG. 2C. For instance, the merchant system 102 can provide the generated communication to the client device 104 and/or client application 112 for display to the user 110. As noted above, in some embodiments the generated communication can include an email. In such embodiments, the merchant system 102 can send to the email to an email address (e.g., the user identifier) associated with the user. As also mentioned briefly above, in some embodiments, the generated communication can include a notification, and in such embodiments, the merchant system 102 can provide the notification within the completed purchase webpage.

Referring still to FIG. 2C, in some embodiments, after disabling (e.g., blocking) use of the product, the merchant system 102 can receive a request to use the product, as shown in act 240 of FIG. 2C. For example, the merchant system 102 can receive a request to download the product (e.g., download a software product) via the provisional account. For instance, a user may select a download option after purchasing the product (e.g., within the same web browsing session). As another non-limiting example, the merchant system 102 can receive a request to operate the product (e.g., run a software product) via the provisional account. In particular, a user may select an option to operate a web based portion of the product. In another non-limiting example, the merchant system 102 can receive a request to login with the provisional account. Specifically, a user may attempt to login to the merchant system 102 after purchasing the product.

In response to receiving the request to use the product, the merchant system 102 determines whether a user identifier associated with the request is associated with a preexisting account of the merchant system, as shown in act 241 of FIG. 2C. For example, as discussed above, the merchant system 102 can query the identification system 106 (e.g., query the identification system 106 via the API gateway) to determine whether the user identifier is associated with a preexisting provisional account or a permanent account of the merchant system 102. In some embodiments, as mentioned above, the identification system 106 can query the database 114 to determine whether the user identifier associated with the request is associated with a preexisting account of the merchant system 102. For instance, the merchant system 102 can query the identification system 106, which, in turn, can compare the received user identifier with user identifiers associated with preexisting accounts of the merchant system 102 within the database 114 and can communicate with the merchant system 102 as to whether the user identifier is associated with a preexisting account.

Also, as described briefly above, if the merchant system 102 determines that the user identifier is associated with a preexisting permanent account, the merchant system 102 can request (e.g., require) that the user input a user credential (e.g., ask for a password) prior to providing access to the purchased product. For instance, the merchant system 102 can require the user to login into the merchant system 102 via the user identifier and user credential.

If, on the other hand, the merchant system 102 determines that the user identifier is associated with a preexisting provisional account, as is discussed in greater detail below in regard to FIG. 4, the merchant system 102 can prevent use of the purchased product, as shown in act 242 of FIG. 2C. For example, the merchant system 102 can deny (e.g., block) use of the purchase product. For instance, in response to a request to download the product, the merchant system 102 can prevent the product from being downloaded. Furthermore, as will be described in greater detail below, the merchant system 102 can require the user to create a user credential prior to enabling use of the purchased product.

For example, in response to the merchant system 102 determining that the user identifier is associated with a preexisting provisional account, the merchant system can provide a request to the user to create a user credential, as shown in act 244 of FIG. 2C. For instance, the merchant system 102 can provide a communication to the user (e.g., a pop-up message in response to a download request) again instructing the user to complete a creation of a permanent account (e.g., create a user credential) with the merchant system 102. For example, the merchant system 102 can provide instructions within the client application GUI and/or the merchant system GUI on how to create a user credential (e.g., set a password). Specifically, the instructions can include any of the instructions described above in regard to acts 236 and 238 of FIGS. 2B and 2C.

Upon being provided with the generated communication of act 238 and/or the request of act 244 of FIG. 2C, the client device 104 detects a user interaction to create the user credential. For example, the client application 112 of the client device 104 detects a user interaction to create a user credential within the client application 112 (e.g., the client application GUI). In some embodiments, the client device 104 can detect a user interaction selecting a link within the sent email and a user interaction inputting a chosen user credential. In additional embodiments, the client device 104 can detect a user interaction inputting a chosen user credential during an attempted login of the user into the merchant system 102. Detecting a user interaction to create a user credential is described in greater detail below in regard to FIGS. 3E-3G.

As shown in FIG. 2C, upon the client device 104 detecting the user interaction to create a user credential, the merchant system 102 receives an indication of the user interaction to create the user credential, as shown in act 242. For example, upon detecting the user interaction to create the user credential, the client device 104 and/or the client application 112 can provide an indication of the user interaction to create the user credential to the merchant system 102. For instance, the client device 104 and/or the client application 112 can provide a data package including the chosen (e.g., inputted) user credential. In one or more embodiments, the merchant system 102 can receive the indication of the user interaction to create the user credential through the network 108.

Although the user interaction to create the user credential is described herein as being detected by and received from the same client device 104 through which the product was purchased, the disclosure is not so limited. Rather, in some instances, the merchant system 102 can enable a purchase of the product through a first client device (e.g., a desktop computer), and the merchant system 102 can receive the indication of the user interaction to create the user credential from a second client device (e.g., a mobile device). In other words, the product can be purchased via a first client device, and the user credential can be created via a second client device. The individual actions of purchasing the product (e.g., creating a provisional account associated with the user identifier) and creating a permanent account associated with the purchase and the user identifier are client device and/or browsing session agnostic. As a result, the merchant system 102 is advantageous over conventional purchasing systems (e.g., guest checkouts), which are typically browsing session specific, and as a result, are client device specific.

In response to receiving the indication of the user interaction to create the user credential, the merchant system 102 creates the user credential, as shown in act 248 of FIG. 2C. For example, upon receiving the indication of the user interaction to create the user credential, the merchant system 102 can set the user credential (e.g., the password). For instance, the merchant system 102 can associate the user credential with the user identifier. In particular, the merchant system 102 can create a data package including the user credential and can associate it with the user identifier within the database 114 of the identification system 106.

Figure 2D:
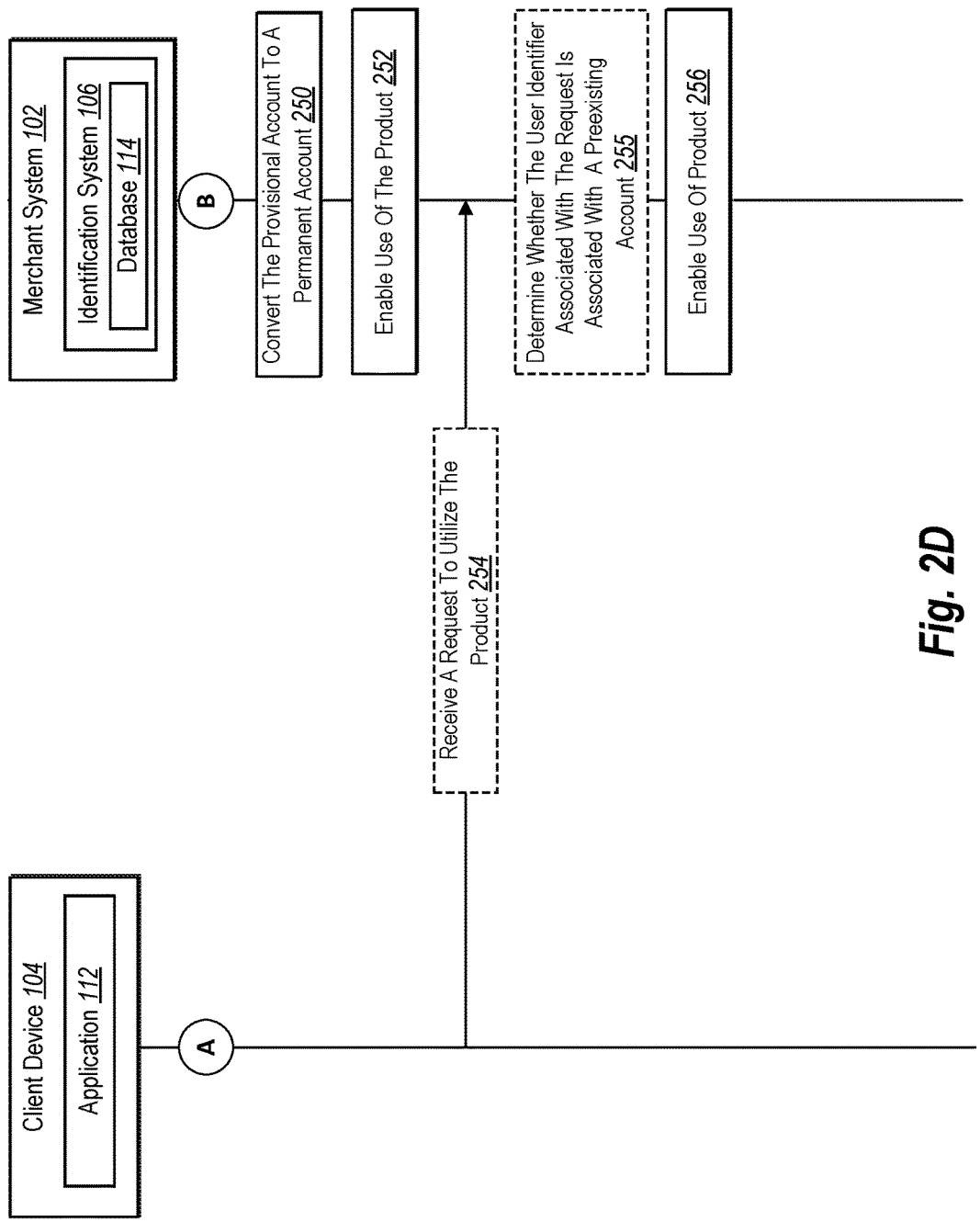

Furthermore, in response to receiving the indication of the user interaction to create the user credential, the merchant system converts the provisional account associated with the user identifier to a permanent account, as shown in act 250 of FIG. 2D. For instance, the merchant system 102 can create a permanent account associated with the user identifier and the user credential. In one or more embodiments, the merchant system 102 can communicate with the identification system 106, and the identification system 106 can convert the provisional account to a permanent account within the database 114 of the merchant system 102. In some embodiments, the merchant system 102 can create the permanent account by creating a data package establishing (e.g., defining) a permanent relationship between the user and the merchant system 102 and associating the user identifier and user credential with the data package within the database 114 of the identification system 106.

As noted above, the merchant system 102 creates the permanent account such that the permanent account is capable of using a purchased product of the merchant system 102. For instance, in some embodiments, when creating the provisional account, the merchant system 102 can associate a permanent identifier with the permanent account within the database 114 of the identification system 106. In other words, the merchant system 102 can tag the permanent account with the permanent identifier within the database 114 of the identification system 106. Furthermore, based on the permanent identifier of the permanent account, the merchant system 102 may allow a user credential to be entered during a login attempt and, as is discussed in greater detail below, upon a valid login, may allow use of the product through the permanent account.

In some instances, the merchant system 102 creates the permanent account by removing the provisional identifier from the provisional account and replacing the provisional identifier with a permanent identifier within the database 114 of the identification system 106. For example, the merchant system 102 creates a data package including the permanent identifier and associates the data package with the account (now the permanent account). In alternative embodiments, the merchant system 102 creates the permanent account by creating an entirely new permanent account and associating the user identifier and user credential with the new permanent account. Furthermore, in such embodiments, the merchant system 102 removes (e.g., deletes) the provisional account from the database 114 of the identification system 106.

Upon creating the permanent account, the merchant system 102 enables use of a purchased product through the permanent account, as shown in act 252 of FIG. 2D. For example, the merchant system 102 enables operation of the product (e.g., operation of a software product) and/or a download of the product via the permanent account. For instance, the permanent account can grant access to (e.g., use of) purchased products.

For example, after the merchant system 102 creates the permanent account and enables use of the purchased product through the permanent account, the merchant system 102 can receive a request to utilize the product, as shown in act 254 of FIG. 2D. For example, the merchant system 102 can receive a request to download the product (e.g., download a software product) via the permanent account. For instance, a user may select a download option after purchasing the product and creating a user credential. As another non-limiting example, the merchant system 102 can receive a request to operate the product (e.g., run a software product) via the permanent account. In particular, a user may select an option to operate a web based portion of the product. As another non-limiting example, the merchant system 102 can receive a request to login to the merchant system 102 with the permanent account. Specifically, a user may attempt to login to the merchant system 102 after purchasing the product and creating a user credential.

In response to receiving the request to utilize the product, the merchant system 102 determines whether a user identifier associated with the request is associated with a preexisting account of the merchant system, as shown in act 255 of FIG. 2C. For example, the merchant system can perform any of the actions described above in regard to acts 214 and 241 of FIGS. 2A and 2C. If, on one hand, the merchant system 102 determines that the user identifier is associated with a preexisting provisional account, the merchant system 102 can perform any of the actions described above in regard to determining that a user identifier is associated with a preexisting provisional account.

If, on the other hand, the merchant system 102 determines that the user identifier is associated with a preexisting permanent account, as is discussed in greater detail below in regard to FIG. 4, the merchant system 102 can request (e.g., require) that the user input a previously created user credential (e.g., ask for a password) prior to providing access to the purchased product.

Furthermore, upon determining that the user identifier is associated with a preexisting permanent account and requiring the user to login to the merchant system 102 (e.g., to provide the user identifier and user credential combination), the merchant system 102 can permit (e.g., allow) use of the product, as shown in act 256 of FIG. 2C. For example, the merchant system 102 allows operation of the product (e.g., operation of a software product) and/or a download of the product (a download of a software product).

Referring FIGS. 2A-2D together, in some embodiments, accounts of the merchant system 102 can be assigned one of at least three statuses. For example, the accounts of the merchant system 102 can be assigned a provisional pre-purchase status, a provisional post-purchase status, and a permanent status. In particular, the merchant system 102 assigns a provisional pre-purchase status to an account where the user has provided a username but has not completed a purchase of a product. Furthermore, the merchant system 102 assigns a provisional post-purchase status to an account where the user has provided a username and has completed a purchase of a product. Moreover, the merchant system 102 assigns a permanent status to an account where the user has provided a username and a user credential. Additionally, as noted above, a status of the account can be assigned within the database 114 of the identification system 106.

FIGS. 3A-3G illustrate a collection of user interfaces including features of the merchant system 102 according to one or more embodiments of the present disclosure. As will be described in more detail below, the components of the merchant system 102 as described in regard to FIGS. 1-2D can provide, along and/or in combination with the other components, one or more graphical user interfaces ("GUIs"). In particular, the components can allow a user to interact with a collection of display elements for a variety of purposes. For instance, FIG. 3A-3G and the description that follows illustrate various example embodiments of the user interfaces and features that are in accordance with one or more embodiments of the present disclosure.

Figure 3A:
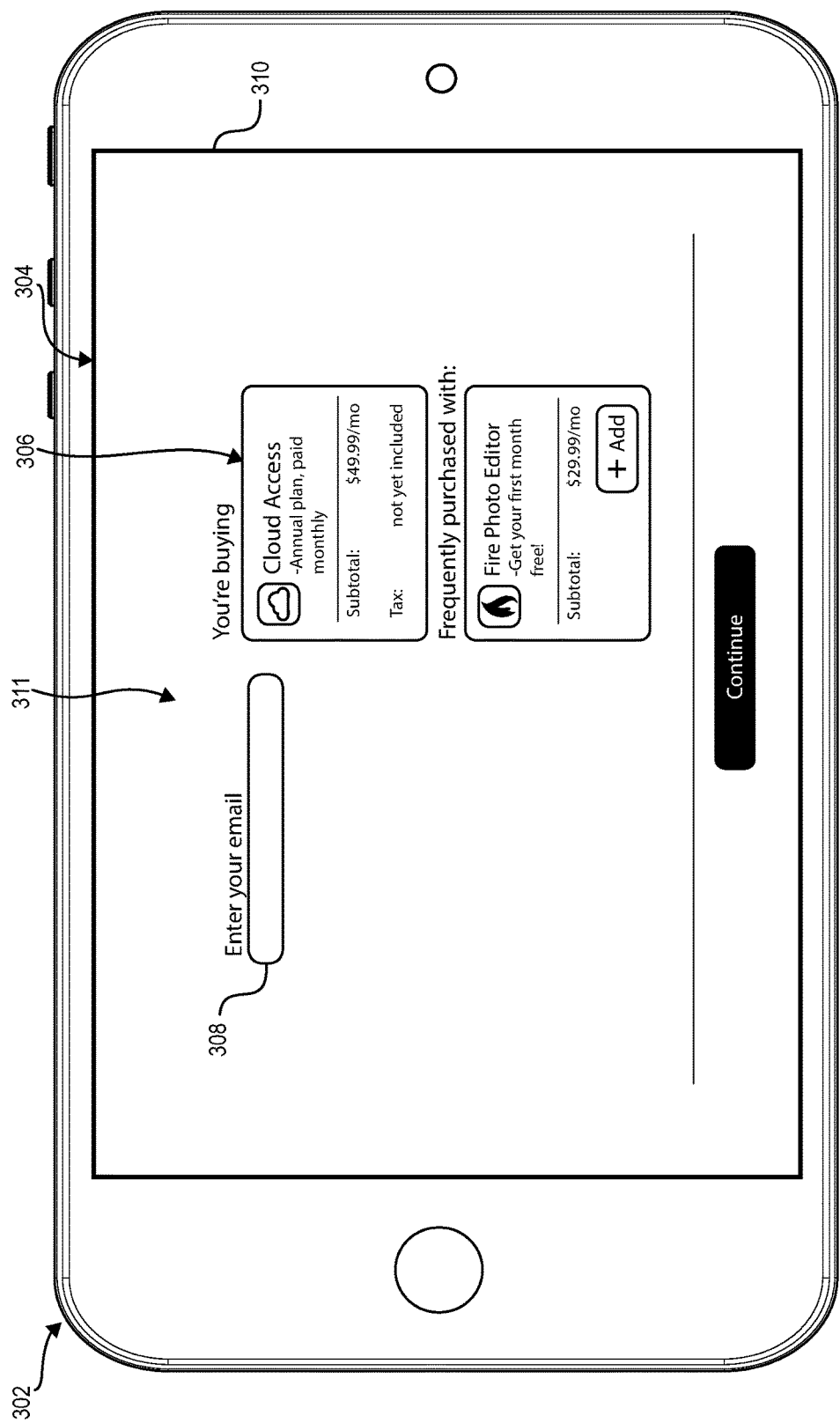
FIGS. 3A-3G illustrate a plurality of schematic representations of graphical user interfaces of the merchant system for enabling use of a product according to one or more embodiments of the present disclosure.

For example, FIG. 3A illustrates a user device 302 that may implement one or more of the components or features of the merchant system. For purposes of the present disclosure, the user device 302 may be a client device (e.g., client device 104). As shown in FIG. 3A, in some embodiments, the user device 302 is a handheld device, such as a tablet device. As used herein, the term "handheld device" refers to a device sized and configured to be held/operated in one or more hands of a user. In additional or alternative examples, however, any other suitable computing device, such as, but not limited to, a mobile phone device, larger wireless device, laptop or desktop computer, a personal digital assistant device, and/or any other suitable computing device can perform one or more of the processes and/or operations described herein.

The user device 302 includes a touch screen display 304 that can display user interfaces. Furthermore, the user device 302 receives and/or detects user input via the touch screen display 304. As used herein, a "touch screen display" refers to the display of a touch screen device. In one or more embodiments, a touch screen device may be the user device 302 with at least one surface upon which a user may perform touch gestures (e.g., a laptop, a tablet computer, a personal digital assistant, a media player, a mobile phone, etc.). Additionally, or alternatively, the user device 302 may include any other suitable input device, such as a touch pad or those described below with reference to FIG. 12.

As shown in FIG. 3A, the touch screen display 304 of the user device 302 displays a merchant system graphical user interface ("GUI") 310 provided by the merchant system 102, which, in some embodiments, can be accessible by the user device 302. For example, as described above in regard to FIG. 1, the user device 302 (e.g., client device 104) can access the merchant system 102 via a network (e.g., network 108). As illustrated in FIG. 3A, the merchant system GUI 310 can display a user identifier input GUI 311 during a purchase process of the user. For example, the merchant system GUI 310 can display the user identifier input GUI 311 in response to a user electing to purchase a product.

Figure 3B:
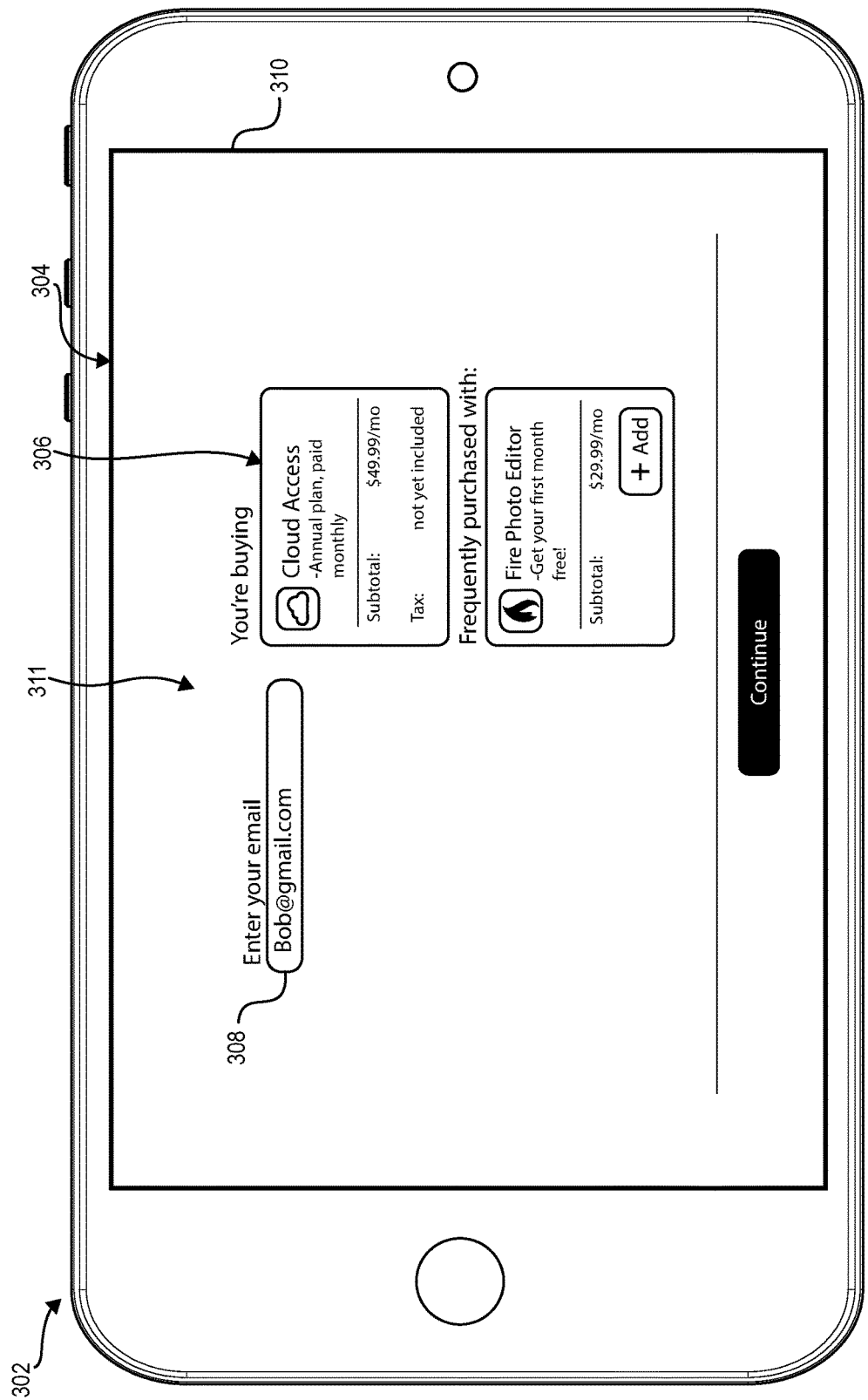

As shown in FIG. 3A, the user identifier input GUI 311 can include a product identifying element 306 that indicates the product that the user is electing to purchase. For example, the product identifying element 306 can identify the product and can indicate a purchasing price. Furthermore, the user identifier input GUI 311 can also include a user identifier input field 308 where the merchant system 102 can receive a user identifier from the user (e.g., where a user can provide the user identifier). As shown in FIG. 3B, a user can enter a username into the user identifier input field 308 and press the continue element. In response to which, the client device can send the entered user identifier to the merchant system 102 as described above in relation to FIG. 2A.

Figure 3C:
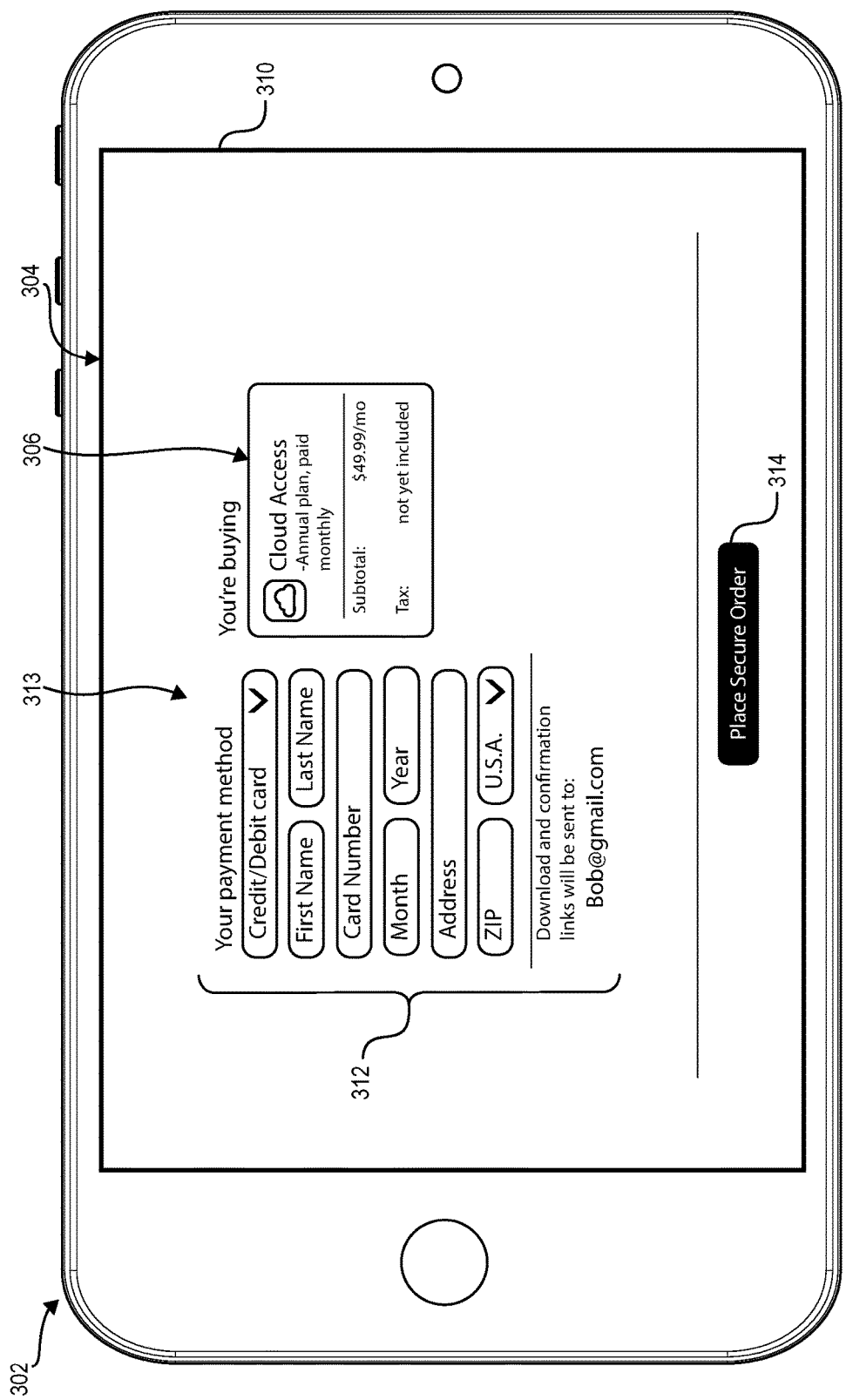
Figure 3D:
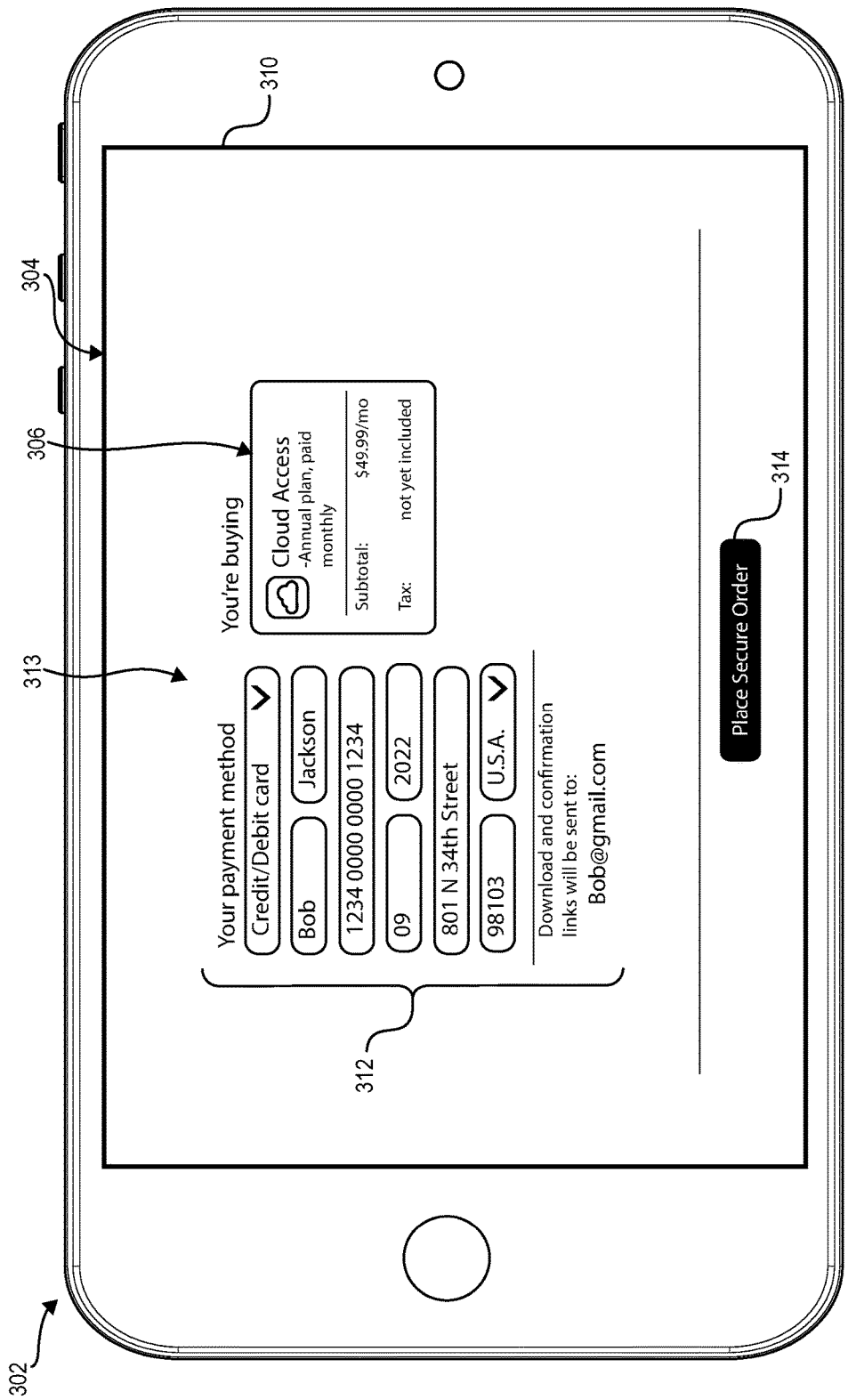

Additionally, as shown in FIGS. 3C and 3D, the merchant system GUI 310 can display a payment information input GUI 313 during a purchase process. For example, the merchant system GUI 310 can display the payment information input GUI 313 in response to receiving the user identifier from the user as shown in FIG. 3B. As illustrated in FIGS. 3C and 3D, the payment information input GUI 313 can include a plurality of payment information fields 312 where the merchant system 102 can receive the payment information from the user. Furthermore, the payment information input GUI 313 can include the product identifying element 306 and a user selectable element 314 for placing (e.g., completing) the purchase. After entering the payment information as shown in FIG. 3C, the user can select the user selectable element 314. In response, the client device 302 can send the payment information 222 to the merchant system 106.

Figure 3E:
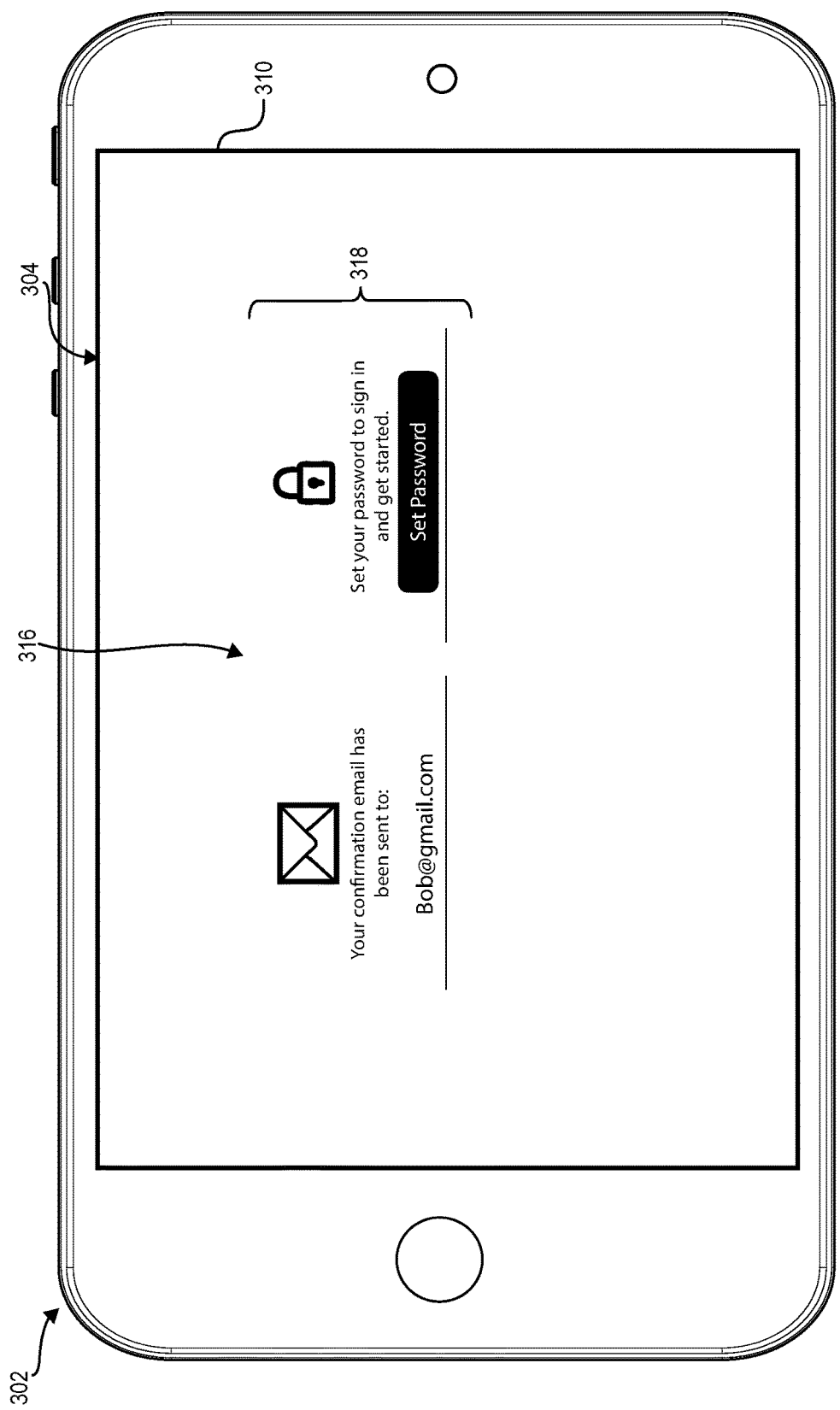

Furthermore, as shown in FIG. 3E, the merchant system GUI 310 can display a purchase confirmation GUI 316. For example, the merchant system GUI 310 can display the purchase confirmation GUI 316 in response the user completing a purchase with the merchant. For instance, the merchant system GUI 310 can display the purchase confirmation GUI 316 during act 236 of FIG. 2B. As illustrated in FIG. 3E, the purchase confirmation GUI 316 can include a confirmation message that the purchase of the product has been completed. Furthermore, the purchase confirmation GUI 316 can include a message indicating that the communication described above in regard to act 234 of FIG. 2B has been sent to the user. Moreover, in some embodiments, the purchase confirmation GUI 316 can include a user credential creation element 318. For example, the purchase confirmation GUI 316 can include a link for creating a user credential.

Figure 3F:
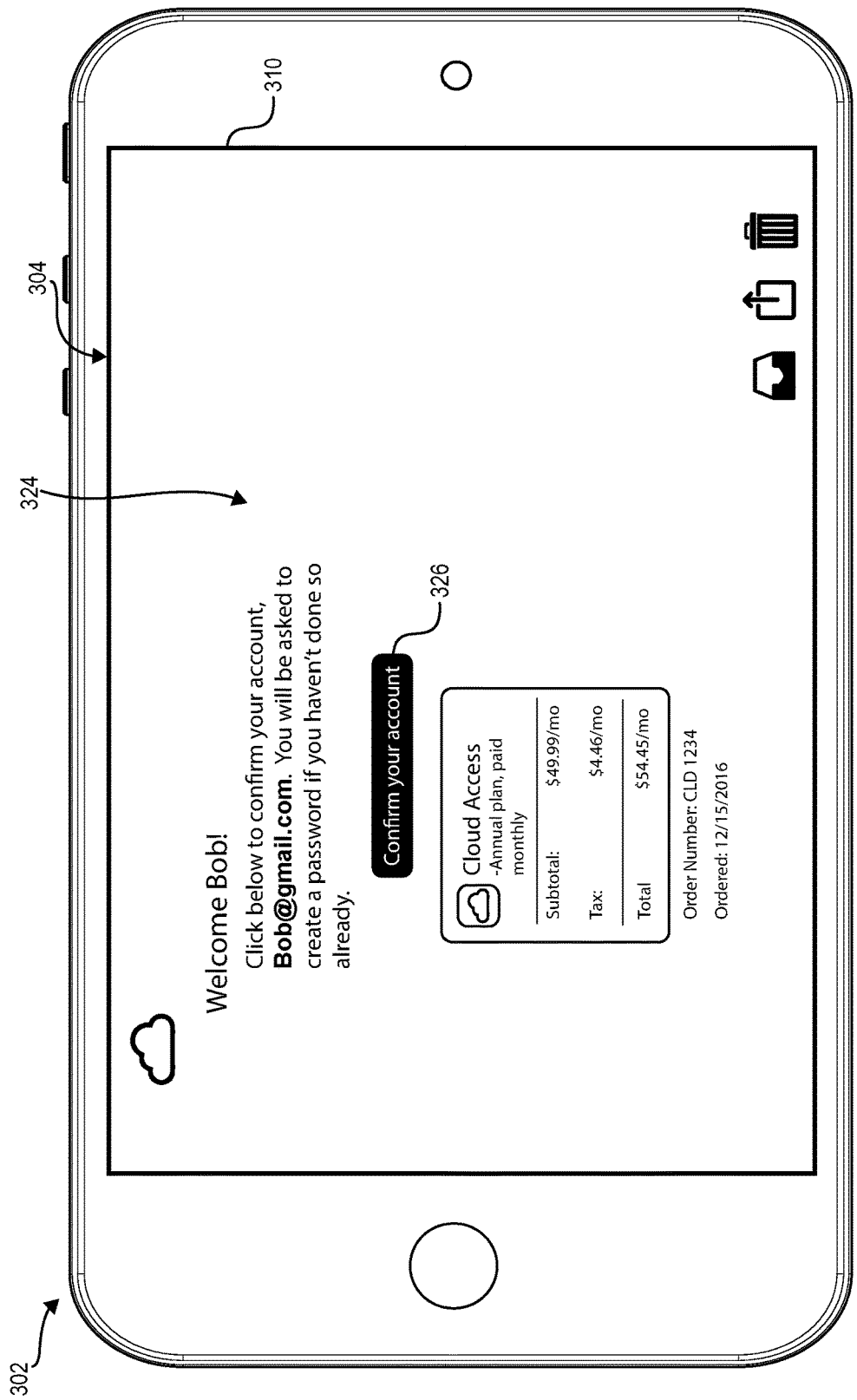
Figure 3G:
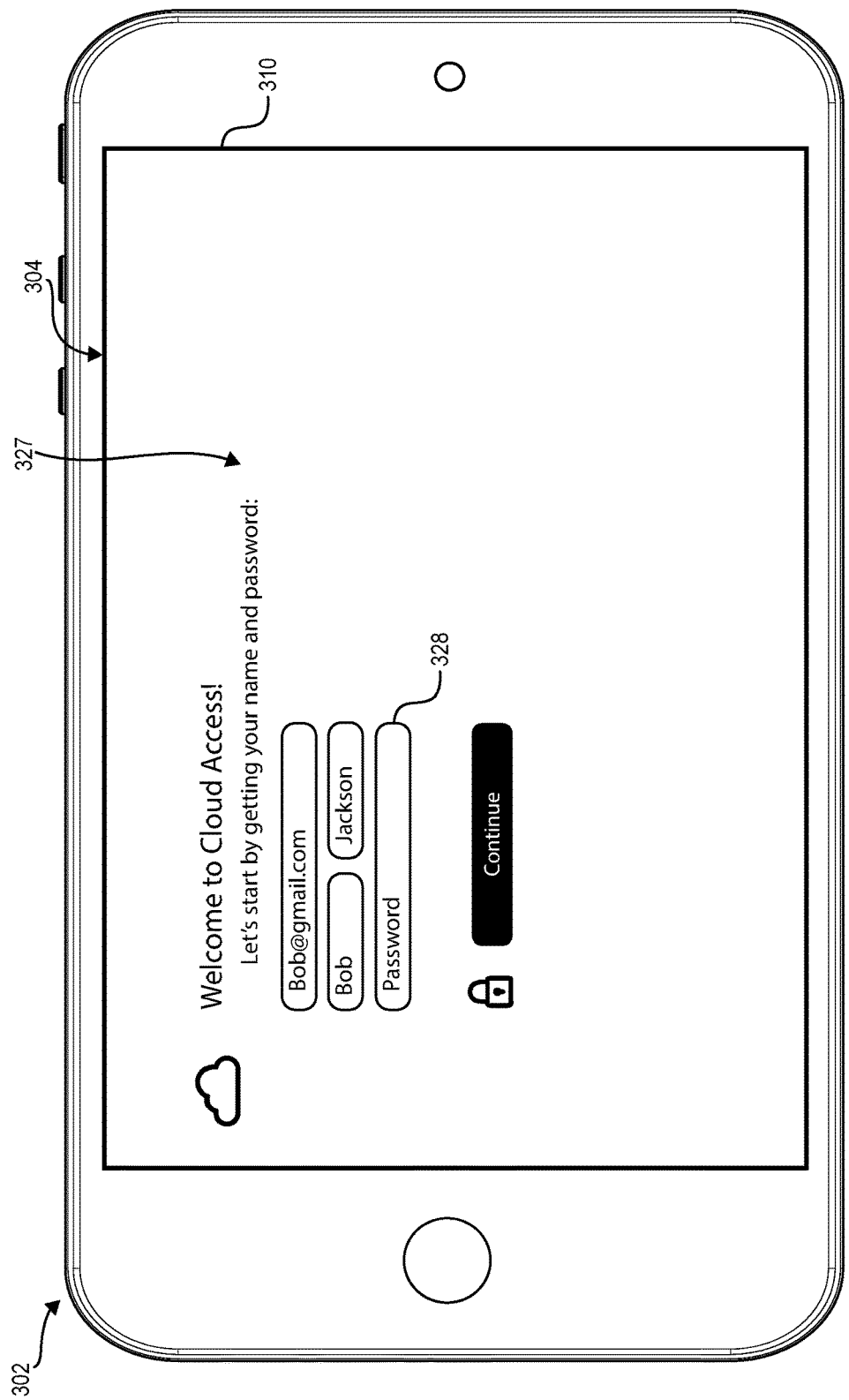

FIG. 3F illustrates an example communication 324 (e.g., email) that the merchant system 102 can provide to the user. For example, the merchant system 102 can provide the communication 324 during act 238 of FIG. 2C. As shown, the communication 324 can include an account confirmation link 326 through which a user can verify an email address and create a user credential. Furthermore, the communication 324 can include any of the communications described above in regard to act 234 of FIG. 2B. One will appreciate that the merchant system 102 provides the purchase confirmation GUI 316 with link for creating a user credential and/or the communication 324 with the account confirmation link 324 only after the user completes the purchase of the product.

In response to a user selection of the link for creating a user credential, the merchant system GUI 310 can display a user credential creation GUI 327. For example, the merchant system GUI 310 can display the user credential creation GUI 327 in response the user selecting the account confirmation link 326 from the communication 324 and/or user credential creation element 318 of the purchase confirmation GUI 316. As shown, the user credential creation GUI 327 can include a user credential input field 328 where the user can input and/or create a user credential. In response to the entering the password in the user credential input field 328, the client device 302 can send the user credential to the merchant system 102 as described above. The merchant system 248 can then convert the provisional account into a permanent account as described above.

Figure 4:
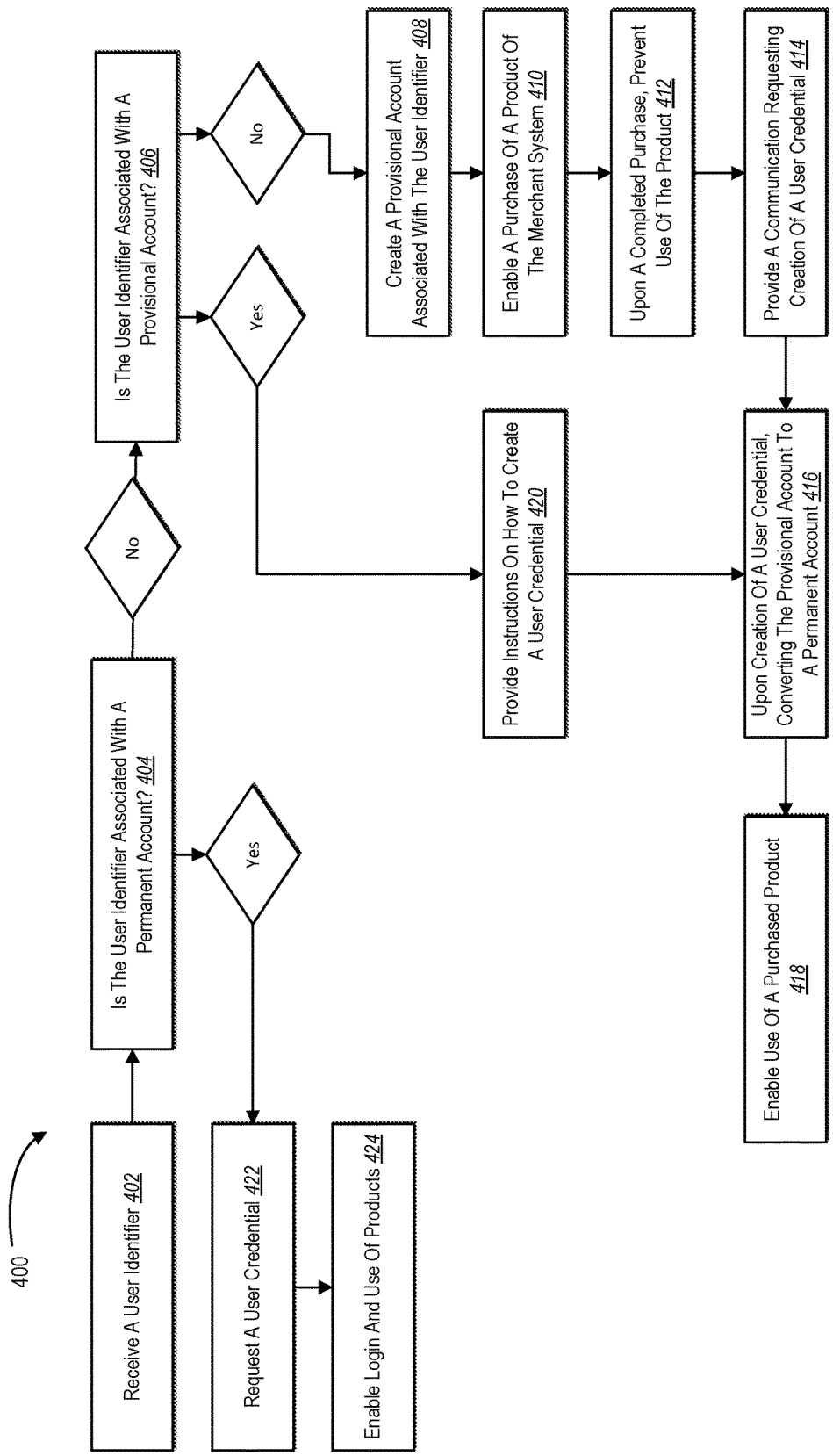
FIG. 4 illustrates an algorithm that a merchant system can utilize to perform a step for preventing use of the software as a service product through the provisional account in accordance with one or more embodiments.

FIG. 4 illustrates a diagram of an algorithm for managing states of user accounts in connection with providing access to software over a network. In particular, FIG. 4 includes an algorithm for a step for 400 preventing use of the software as a service product associated with the provisional account. Furthermore, the step for 400 can include any of the actions described below in regard to boxes 402 and 406-420. As illustrated in box 402 of FIG. 4, the algorithm includes receiving a user identifier. For example, the merchant system can receive a user identifier from a client device (e.g., client device 104) In some embodiments, the merchant system 102 can receive a user identifier during a purchase process (e.g., in response to a request for the user identifier during a purchase process). In additional embodiments, the merchant system 102 can receive a user identifier during a login attempt (e.g., an attempt to login to the merchant system 102) by a user. For example, the algorithm can include any of the actions describe above in regard to acts 212 and 240 of FIGS. 2B and 2C.

Additionally, the algorithm includes determining whether the received user identifier is associated with a permanent account of the merchant system 102, as shown in box 404 of FIG. 4. For example, the merchant system 102 can query the identification system 106 and the database 114 to determine whether the user credential is associated with a permanent account of the merchant system 102. For example, in some embodiments, the merchant system 102 can communicate with the identification system 106, which can, in turn, query the database 114 to determine whether the user credential is associated with a permanent account. Furthermore, the algorithm can include any of the actions described above in regard to acts 214, 241, 255 of FIGS. 2B-2D.

If the merchant system 102 determines that the user identifier is associated with a permanent account of the merchant system 102, the algorithm includes requesting the user credential, as shown in box 422 of FIG. 4. For example, the merchant system can request the user credential within the client application 112 (e.g., a web browser and/or application specific to the merchant system 102 (e.g., a shopping application)) of the client device 104. In other words, the merchant system 102 can ask for a password associated with the received user identifier. In some embodiments, the merchant system 102 can request the user credential via a user credential input field of the merchant system GUI 310.

Furthermore, upon receiving the user credential (e.g., a combination of the user identifier and the user credential), the algorithm includes enabling the user to login to the merchant system 102 and enabling use of products of the merchant system 102, as shown in box 424 of FIG. 4. In particular, the merchant system 102 allows a user to use purchased products of the merchant system 102 via the permanent account. In some embodiments, the merchant system 102 can enable a download of the purchased products. In additional embodiments, the merchant system 102 can enable operation of the purchased products.

If, on the other hand, the merchant system 102 determines that the user identifier is not associated with a permanent account of the merchant system 102, the algorithm includes determining whether the received user identifier is associated with a provisional account of the merchant system 102, as shown in box 406 of FIG. 4. For example, the merchant system 102 can query the identification system 106 and the database 114 to determine whether the user credential is associated with a provisional account of the merchant system 102. For example, in some embodiments, the merchant system 102 can communicate with (e.g., call) the identification system 106, which, in turn, can (e.g., query the database 114 to) determine whether the user credential is associated with a provisional account. Furthermore, the algorithm can include any of the actions described above in regard to acts 214, 241, 255 of FIGS. 2B-2D.

If the merchant system 102 determines that the user identifier is associated with a provisional account of the merchant system 102, the algorithm includes providing instructions to the user on how to create a user credential, as show in box 420 of FIG. 4. For example, the merchant system 102 can provide instructions within the client application GUI and/or the merchant system GUI on how to create a user credential (e.g., set a password). In some embodiments, the instructions can direct the user to create a user credential through a link a previously sent email. In other embodiments, the instructions can direct the user to create a user credential within the client application GUI and/or the merchant system GUI (e.g., within the current web browsing session). In yet other embodiments, the instructions can provide an option to resend the previously sent email including a link to create a user credential.

If the merchant system 102 determines that the user identifier is not associated with a provisional account, the algorithm includes creating a provisional account associated with the user identifier, as shown in box 408 of FIG. 4. For example, as mentioned above in regard to act 216 of FIG. 2A, the merchant system 102 can communicate with the identification system 106, and the identification system 106 can create the provisional account within the database 114 of the merchant system 102. In some embodiments, the merchant system 102 can create the provisional account by creating a data package establishing (e.g., defining) a provisional relationship between the user and the merchant system 102 and associating the user identifier with the data package within the database 114 of the identification system 106. For example, the provisional account can allow a user to purchase a product while denying use of the product.

As noted above, the merchant system creates a provisional account that enables (e.g., permits) a user to purchase products from the merchant system but does not allow the user to use the purchased products. For instance, in some embodiments, when creating the provisional account, the merchant system 102 can associate a provisional identifier with the provisional account within the database 114 of the identification system 106. In other words, the merchant system 102 can tag (e.g., mark or label) the provisional account with the provisional identifier (e.g., tag) within the database 114 of the identification system 106. Furthermore, based on the provisional identifier of the provisional account, the merchant system 102 may not allow a user credential to be entered during a login attempt and may not allow use of the product through the provisional account. As will be discussed in greater detail below, the provisional account requires a user to perform additional actions (e.g., claiming actions) to create a permanent account and to create a user credential in order to use the purchased product.

In some embodiments, creating the provisional account can further include reserving the received user identifier for the provisional account within the database 114 of the identification system 106. Furthermore, the merchant system 102 can create a data package associated with the user identifier that defines the access of the provisional account of the user and can store the data package within the database 114 of the identification system 106. Moreover, the algorithm can include any of the actions described above in regard to acts 216 and 224.

Upon creating the provisional account, the algorithm includes enabling a purchase of products of the merchant system through the provisional account, as shown in box 410 of FIG. 4. For example, the merchant system 102 can enable purchase of products of the merchant system 102 through any of the manners described above in regard to act 226 of FIG. 2B.

Furthermore, in response to a completed purchase of a product of the merchant system, the algorithm includes preventing (e.g., blocking) use of the purchased product through the provisional account, as shown in box 412 of FIG. 4. For example, the merchant system 102 blocks operation of the product (e.g. operation of a software product) within the provisional account and blocks (e.g., prevents) a download of the product (e.g. download of the software product). In particular, the merchant system 102 can block use of the product within the provisional account. In particular, the merchant system 102 can block use of the product merely via the assigned provisional state of the provisional account of the user (due to the provisional identifier). As will be discussed in greater detail below, the merchant system can block use of the purchase product until the user completes a claiming action (e.g., creating a user credential (e.g., password)). Furthermore, the algorithm can include any of the actions described above in regard to acts 232 and 242.

Moreover, upon the merchant system preventing use of the product, the algorithm includes providing a communication requesting that the user create a user credential, as shown in box 414 of FIG. 4. For example, the merchant system 102 can provide a communication to the user requesting that the user complete a creation of a permanent account with the merchant system 102 (e.g., complete a claiming action). In some embodiments, the merchant system 102 can provide a communication to the user requesting that the user verify an email address and create a password. For example, the communication can include an email to the user having a link within the email for verifying the email address and for creating (e.g., choosing) a user credential (e.g., password).

Furthermore, as noted above, the communication can include a notification within the client application 112 of the client device 104 having a link for creating a user credential. For example, the communication can include notification (e.g., option) on a purchase confirmation web page. In such embodiments, the notification can include a message requesting that the user create a user credential (e.g., password). For example, the algorithm can include any of the actions described above in regard to acts 234, 236, and 244 of FIGS. 2B and 2C.

Upon the creation of a user credential, for example, a creation of a user credential through any of the actions described above in regard to acts 246 and 248 of FIG. 2C, the algorithm can include converting the provisional account into a permanent account, as shown in box 416 of FIG. 4. For example, the merchant system 102 can create a permanent account associated with the user identifier and the user credential. In some embodiments, the merchant system 102 can create the permanent account by associating a permanent identifier with the permanent account within the database 114 of the identification system 106. In other words, the merchant system 102 can tag the permanent account with the permanent identifier within the database 114 of the identification system 106.

In some embodiments, the merchant system 102 creates the permanent account by removing the provisional identifier from the provisional account and replacing the provisional identifier with a permanent identifier within the database 114 of the identification system 106. For example, the merchant system 102 creates a data package including the permanent identifier and associates the data package with the account (now the permanent account). In alternative embodiments, the merchant system 102 creates the permanent account by creating an entirely new permanent account and associating the user identifier and user credential with the new permanent account. Furthermore, as mentioned above, in such embodiments, the merchant system 102 removes (e.g., deletes) the provisional account from the database 114 of the identification system 106.

Upon creating the permanent account, the algorithm includes enabling use of a purchased product through the permanent account, as shown in act 252 of FIG. 2D. For example, in response to receiving a valid user identifier and user credential (e.g., logging into a valid permanent account) the merchant system 102 enables operation of the product (e.g., operation of a software product) and/or a download of the product via the permanent account.

FIGS. 1-4, the corresponding text, and the examples, provide a number of different systems and devices for managing states of user accounts in connection with providing access to software over a network. In addition to the foregoing, embodiments can be described in terms of flowcharts comprising acts and steps in a method for accomplishing a particular result. For example, FIGS. 5 and 6 illustrate flowcharts of exemplary methods in accordance with one or more embodiments.

Figure 5:
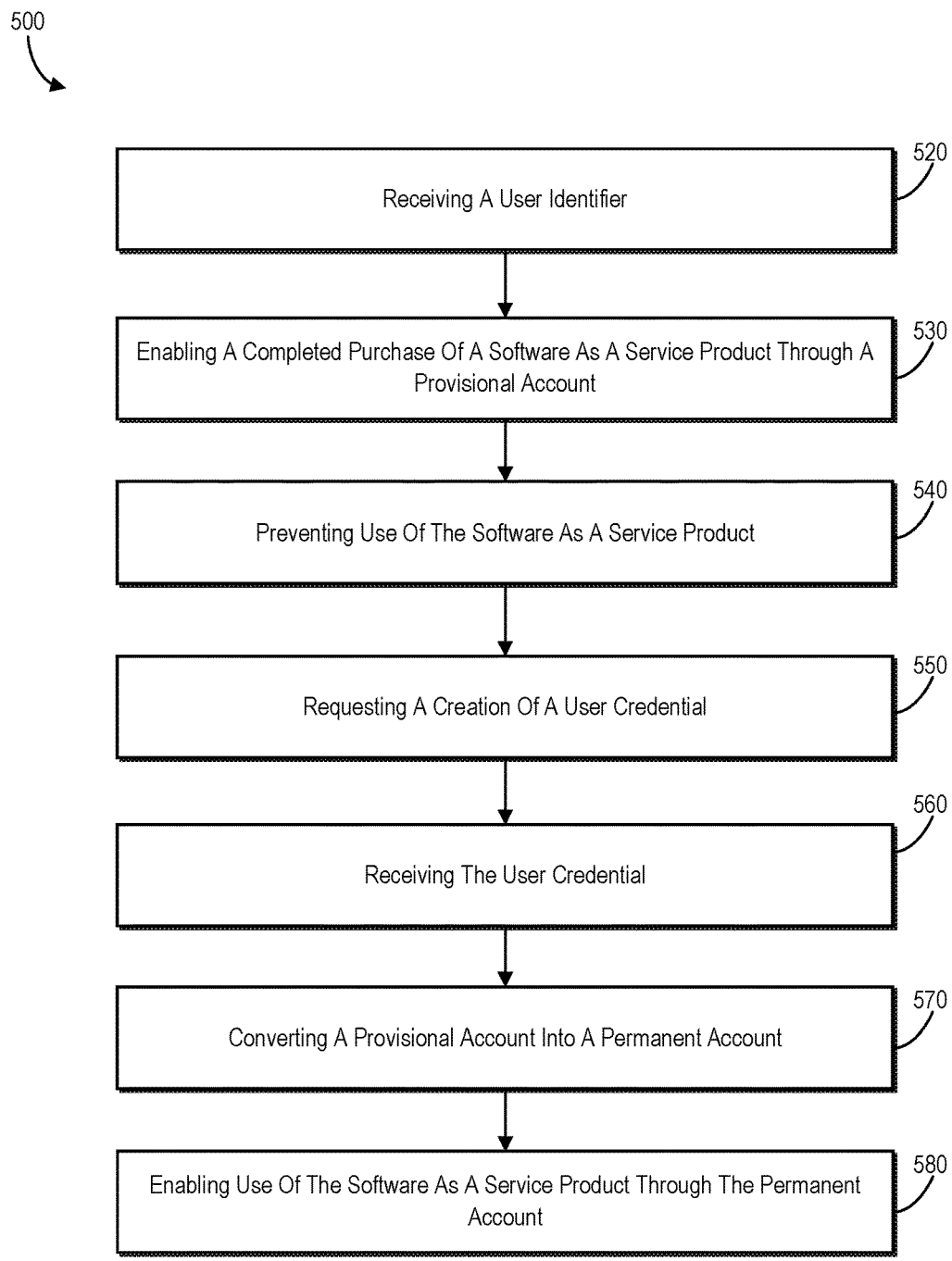
FIG. 5 illustrates a flowchart of an example method for enabling a download of a software as a service product according to one or more embodiments of the present disclosure.
Figure 6:
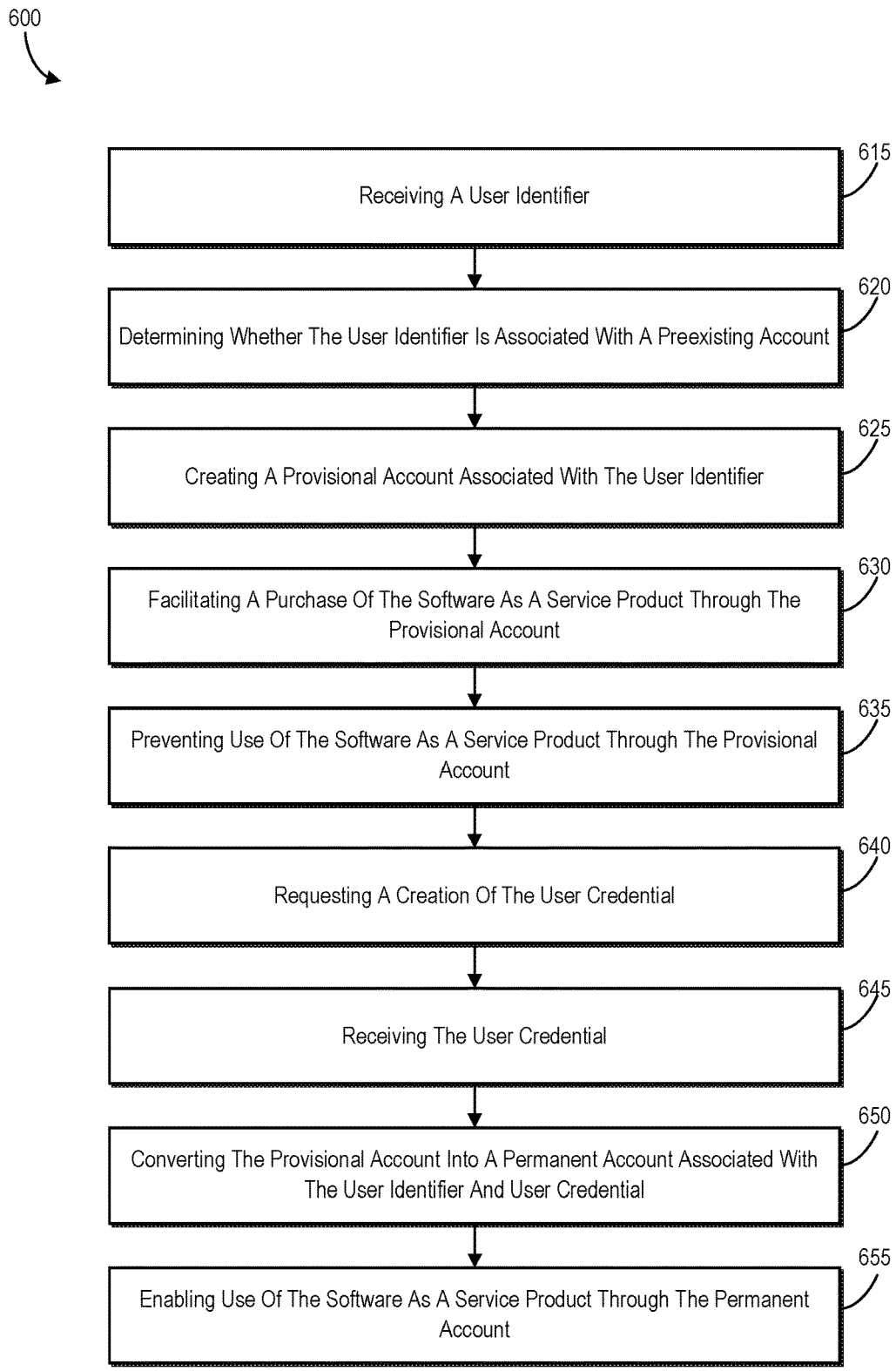
FIG. 6 illustrates a flowchart of another example method for enabling a download of a software as a service product according to one or more embodiments of the present disclosure.

FIG. 5 illustrates a flowchart of an example method 500 of managing states of user accounts in connection with providing access to software over a network. The method 500 can be implemented by the merchant system 102 described above. In some embodiments, the method 500 involves an act 520 of receiving a user identifier. Specifically, the act 520 can include receiving the user identifier from a user via a client device in connection with a request to purchase a software as a service product. In some instances, the act 520 can include receiving the user identifier from a first web browsing session. Moreover, the act 520 can include any of the actions described above in regard act 212 to FIG. 2A.

Additionally, the method 500 includes an act 530 of enabling a purchase of a software as a service product through a provisional account. The method 500 can include associating the purchase of the software as a service product and the user identifier with a provisional account. In particular, the act 530 may include enabling a purchase of the software as a service product without requiring creation of a full user account. For example, act 530 can involve enabling purchase of the software product without requiring a password.

In some instances, act 530 can further include receiving a request, associated with the user identifier, to download the software as a service product, determining that the user identifier is associated with the permanent account, and enabling a download of the software as a service product. Additionally, the act 530 can include any of the actions described above in regard to acts 214-226 of FIGS. 2A and 2B.

Moreover, the method 500 includes an act 540 of preventing use of the software as a service product. For example, the act 540 may include preventing use of the software as a service product through the provisional account. Furthermore, the act 540 can include receiving a request, associated with the user identifier, to download the software as a service product, determining that the user identifier is associated with the provisional account, blocking a download of the software as a service product, and requesting a user credential to enable access to the purchased software as a service product. Additionally, the act 540 may include any of the actions described above in regard to acts 232 and 242 of FIGS. 2B and 2C.

Furthermore, the method 500 includes an act 550 of requesting a creation of a user credential. For instance, the act 550 can include, in response to a completed purchase of the software as a service product, requesting a creation of a user credential. In some embodiments, requesting a creation of a user credential includes sending an email to the user requesting a creation of a user credential. In additional embodiments, requesting a creation of a user credential includes providing a request within a confirmation webpage of a completed purchase of the software as a service product. Additionally, the act 550 may include any of the actions described above in regard to acts 234 and 238 of FIGS. 2B and 2C.

Also, the method 500 includes an act 560 of receiving the user credential. For instance, the act 560 can include receiving the user credential from the user via the client device. Furthermore, in some embodiments, the user credential is received from a second, different client device. Moreover, the act 560 can include any of the actions described above in regard to act 246 of FIG. 2C.

Additionally, the method 500 includes an act 570 of converting a provisional account into a permanent account. For instance, the act 570 can include, in response to receiving the user credential, converting the provisional account into a permanent account associated with the user identifier and user credential. Furthermore, ins some embodiments, the act 570 can include removing a provisional identifier from the provisional account within the database of the identification system, associating a permanent identifier with the provisional account within the database of the identification system to create the permanent account, and associating the user credential with the permanent account. In alternative embodiments, the act 570 can include removing the provisional account and an associated provisional identifier from the database of the identification system, creating a new permanent account within the database of the identification system, associating a permanent identifier with the permanent account within the database of the identification system, and associating the user identifier and the user credential with the permanent account within the database of the identification system. Moreover, the act 570 can include any of the actions described above in regard to act 250 of FIG. 2D.

Additionally, the method 500 includes an act 580 of enabling use of the software as a service product through the permanent account. For instance, the act 570 can include, receiving a request, associated with the user identifier, to download the software as a service product, determining that the user identifier is associated with the permanent account, and enabling a download of the software as a service product. In some embodiments, the act 580 can include comprises enabling a download of the software as a service product. In additional embodiments, the act 580 can include enabling operation of the software as a service product. Moreover, the act 580 can include any of the actions described above in regard to act 252 of FIG. 2D.

FIG. 6 illustrates a flowchart of an example method 600 of managing states of user accounts in connection with providing access to software over a network. The method 600 can be implemented by the merchant system 102 described above. In some embodiments, the method 600 involves an act 615 of receiving the user identifier. Specifically, the act 615 can include receiving the user identifier from a user via a client device in connection with a request to purchase a software as a service product. In some instances, the act 615 can include receiving the user identifier from a first web browsing session. Moreover, the act 615 can include any of the actions described above in regard act 212 to FIG. 2A.

Additionally, the method 600 includes an act 620 determining whether the user identifier is associated with a preexisting account. For example, the act 620 can include determining whether the user identifier is associated with a preexisting account of a merchant system related to the software as a service product by querying an identification system. For instance, the act 620 can include querying an identification system and comparing the user identifier with preexisting accounts.

Additionally, the method 600 includes an act 625 of creating a provisional account associated with the user identifier. In particular, the act 625 may include, upon determining that the user identifier is not associated with a preexisting account, creating a provisional account associated with the user identifier. In some instances, the act 625 can further include creating the provisional account such that the provisional account enables the user to download at least one downloadable image from the database of downloadable images. Additionally, the act 625 can include any of the actions described above in regard to act 216 of FIGS. 2A and 2B. Additionally, the method 600 includes an act 630 of enabling a purchase of the software as a service product through a provisional account. In particular, the act 630 may include facilitating a purchase of the software as a service product through the provisional account without a creation of a full user credential. In some instances, act 630 can further include receiving a request, associated with the user identifier, to download the software as a service product, determining that the user identifier is associated with the permanent account, and enabling a download of the software as a service product. Additionally, the act 630 can include any of the actions described above in regard to acts 214-226 of FIGS. 2A and 2B.

Moreover, the method 600 includes an act 635 of preventing use of the software as a service product. For example, the act 635 may include preventing use of the software as a service product through the provisional account by blocking one or more of a download of the software as a service product and operation of the software as a service product through the provisional account. For example, the act 635 can include receiving a request, associated with the user identifier, to download the software as a service product, determining that the user identifier is associated with the provisional account, and blocking a download of the software as a service product. Additionally, the act 635 may include any of the actions described above in regard to acts 232 and 242 of FIGS. 2B and 2C.

Furthermore, the method 600 includes an act 640 of requesting a user credential. For instance, the act 640 can include requesting a user credential to enable access to the purchased software as a service product. In some embodiments, requesting a user credential includes sending an email to the user requesting a creation of a user credential. In additional embodiments, requesting a user credential includes providing a request within a confirmation webpage of a completed purchase of the software as a service product. Additionally, the act 640 may include any of the actions described above in regard to acts 234 and 238 of FIGS. 2B and 2C.

Also, the method 600 includes an act 645 of receiving the user credential. For instance, the act 560 can include receiving the user credential from the user via the client device. Furthermore, in some embodiments, the user credential is received from a second, different client device. Moreover, the act 645 can include any of the actions described above in regard to act 246 of FIG. 2C.

Additionally, the method 600 includes an act 650 of converting a provisional account into a permanent account. For instance, the act 650 can include, in response to receiving the user credential, converting the provisional account into a permanent account associated with the user identifier, the user credential, and the purchase of the software as a service product. Furthermore, in some embodiments, the act 650 can include removing a provisional identifier from the provisional account within the database of the identification system, associating a permanent identifier with the provisional account within the database of the identification system to create the permanent account, and associating the user credential with the permanent account. In alternative embodiments, the act 650 can include removing the provisional account and an associated provisional identifier from the database of the identification system, creating a new permanent account within the database of the identification system, associating a permanent identifier with the permanent account within the database of the identification system, and associating the user identifier and the user credential with the permanent account within the database of the identification system. Moreover, the act 650 can include any of the actions described above in regard to act 250 of FIG. 2D.

Additionally, the method 600 includes an act 655 of enabling use of the software as a service product through the permanent account. For instance, the act 655 can include, enabling use of the software as a service product through the permanent account by permitting one or more of a download of the software as a service product and operation of the software as a service product through the permanent account. Moreover, the act 655 can include any of the actions described above in regard to act 252 of FIG. 2D.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
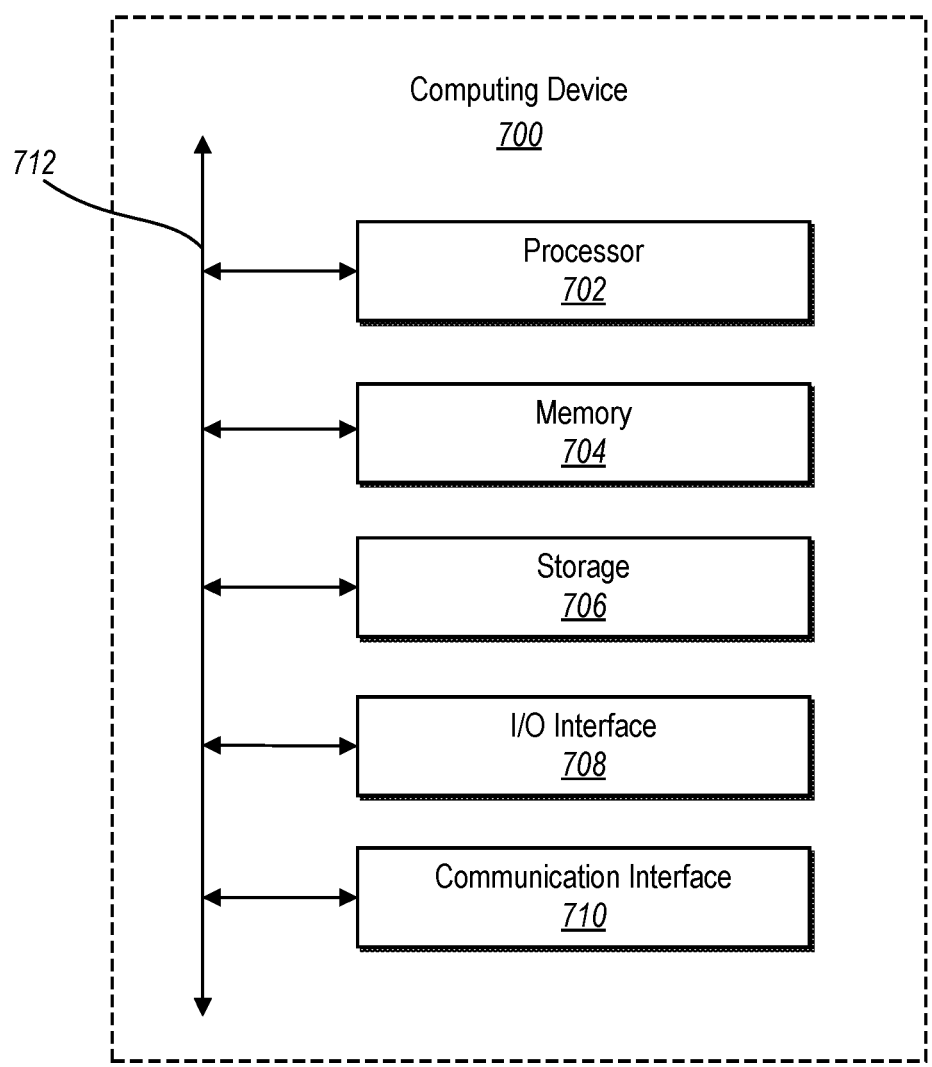
FIG. 7 illustrates a block diagram of an example computing device in accordance with one or more embodiments of the present disclosure.

FIG. 7 illustrates a block diagram of an example computing device 700 that may be configured to perform one or more of the processes described above. One will appreciate that one or more computing devices such as the computing device 700 may implement the merchant system 102. As shown by FIG. 7, the computing device 700 can comprise a processor 702, a memory 704, a storage device 706, an I/O interface 708, and a communication interface 710, which may be communicatively coupled by way of a communication infrastructure. While an example computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example, and not by way of limitation, the processor 702 may include one or more instruction caches, one or more data caches, and one or more translation look aside buffers (TLBs). Instructions in the instruction caches may be copies of instructions in the memory 704 or the storage 706.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The computing device 700 includes a storage device 706 that includes storage for storing data or instructions. As an example, and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 700 also includes one or more input or output ("I/O") devices/interfaces 708, which are provided to allow a user to provide input to, receive output from, and otherwise transfer data to and receive data from computing device 700. The I/O devices/interfaces 708 may include a mouse, a keypad or a keyboard, a touch screen, a camera, an optical scanner, network interface, modem, other known I/O devices or a combination of such I/O device/interfaces. The touch screen may be activated with a stylus or a finger.

The I/O devices/interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device 700 and one or more other computing devices or networks. As an example, and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 can comprise hardware, software, or both that couples components of computing device 700 to each other.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this invention. Indeed, various modifications of the present disclosure, in addition to those shown and described herein, such as alternative useful combinations of the content features described, may become apparent to those skilled in the art from the description. Such modifications and embodiments are also intended to fall within the scope of the appended claims and legal equivalents.

We claim:

1. A computer-implemented method of managing states of user accounts in connection with providing access to software over a network, the method comprising:
   receiving a user identifier in connection with a request to purchase a software as a service product;
   determining whether the user identifier is associated with a preexisting account related to the software as a service product by querying an identification system;
   upon determining that the user identifier is not associated with a preexisting account, creating a provisional account related to the software as a service product;
   enabling a purchase of the software as a service product through the provisional account without requiring creation of a full user account;
   receiving a request associated with the user identifier, to access the software as a service product;
   determining that the user identifier is associated with the provisional account by querying the identification system;
   in response to determining that the user identifier is associated with the provisional account:
      preventing use of the software as a service product through the provisional account, despite the purchase of the software, by blocking one or more of a download of the software as a service product or operation of the software as a service product through the provisional account; and
      requesting a user credential to enable access to the purchased software as a service product;
   receiving the user credential;
   in response to receiving the user credential, converting the provisional account into a permanent account associated with the user identifier, the user credential, and the purchase of the software as a service product; and
   enabling use of the software as a service product through the permanent account by permitting one or more of the download of the software as a service product or operation of the software as a service product through the permanent account.

2. The method of claim 1, wherein enabling purchase of the software as a service product through the provisional account without requiring creation of a full user account comprises enabling purchase of the software as a service product without requiring a password.

3. The method of claim 1, further comprising, in response to enabling purchase of the software as a service product through the provisional account without requiring creation of a full user account, issuing an access token, wherein the access token is limited to a web browser session within which the software as a service product was purchased, and wherein the access token provides limited access to the software as a service product.

4. The method of claim 3, wherein the software as a service product comprises access to a database of downloadable images.

5. The method of claim 4, wherein the provisional account enables the user to download at least one downloadable image from the database of downloadable images.

6. The method of claim 3, wherein enabling use of the software as a service product through the permanent account comprises:
   receiving a subsequent request to access the software as a service product, the subsequent request being associated with the user identifier; and
   querying the identification system and comparing the user identifier with preexisting accounts to determine that the user identifier is associated with a preexisting permanent account.

7. The method of claim 1, wherein requesting a user credential to enable use of the purchased software as a service product comprises sending an email requesting a creation of a user credential in response to the purchase of the software as a service product.

8. The method of claim 1, wherein determining that the user identifier is associated with the provisional account comprises querying the identification system and comparing the user identifier with preexisting accounts to determine that the user identifier is associated with a preexisting provisional account.

9. The method of claim 1, wherein enabling use of the software as a service product through the permanent account comprises enabling a download of the software as a service product.

10. The method of claim 1, wherein the user identifier is received within a first web browser session, and wherein the user credential is received within a subsequent second web browser session.

11. A computer-implemented method of managing states of user accounts in connection with providing access to software over a network, the method comprising:
    receiving a user identifier in connection with a request to purchase a software as a service product;
    enabling purchase of the software as a service product without requiring creation of a full user account;
    associating the purchase of the software as a service product and the user identifier with a provisional account;
    a step for preventing use of the software as a service product associated with the provisional account despite the purchase of the software;
    requesting a user credential to enable use of the purchased software as a service product;
    receiving the user credential;
    in response to receiving the user credential, converting the provisional account into a permanent account associated with the user identifier, the user credential, and the purchase of the software as a service product; and
    enabling use of the software as a service product through the permanent account.

12. The method of claim 11, wherein enabling purchase of the software as a service product without requiring creation of a full user account comprises enabling purchase of the software as a service product without requiring a password.

13. The method of claim 11, wherein enabling use of the software as a service product comprises:
    receiving a request, associated with the user identifier, to download the software as a service product;
    determining that the user identifier is associated with the permanent account; and
    enabling a download of the software as a service product in response to determining that the user identifier is associated with the permanent account.

14. The method of claim 11, wherein requesting the user credential to enable use of the purchased software as a service product comprises sending an email requesting a creation of the user credential in response to the purchase of the software as a service product.

15. The method of claim 11, wherein requesting the user credential to enable use of the purchased software as a service product comprises providing a request within a confirmation webpage associated with the purchase of the software as a service product.

16. The method of claim 11, further comprising receiving a request to purchase the software as a service product from a first client device, wherein receiving the user credential comprises receiving the user credential from a second, different client device.

17. The method of claim 11, wherein enabling use of the software as a service product through the permanent account comprises enabling a download of the software as a service product.

18. A system for managing states of user accounts in connection with providing access to software over a network, the system comprising:
    memory comprising an identification system that maintains a mapping between user identifiers and a status as provisional accounts or permanent accounts;
    at least one server; and
    a non-transitory computer readable storage medium comprising instructions that, when executed by the at least one server, cause the system to:
        receive a user identifier in connection with a request to purchase a software as a service product;
        determine whether the user identifier is associated with a preexisting account related to the software as a service product by querying the identification system and comparing the user identifier with user identifiers of the preexisting accounts;
        upon determining that the user identifier is not associated with a preexisting account, create a provisional account related to a software as a service product by associating the user identifier with the provisional account within the identification system;
        facilitate a purchase of the software as a service product through the provisional account without a creation of a user credential;
        prevent use of the software as a service product through the provisional account, despite the purchase of the software, by blocking one or more of a download of the software as a service product or operation of the software as a service product through the provisional account;
        in response to a completed purchase of the software as a service product, request the creation of the user credential;
        receive the user credential from a client device;
        in response to receiving the user credential, convert the provisional account associated with the user identifier into a permanent account associated with the user identifier and the user credential by associating the user identifier and the user credential with the permanent account within the identification system; and enable use of the software as a service product through the permanent account by permitting one or more of the download of the software as a service product or operation of the software as a service product through the permanent account.

19. The system of claim 18, further comprising instructions that, when executed by the at least one server, cause the system to:

receive a request, associated with the user identifier, to download the software as a service product;

determine that the user identifier is associated with the permanent account; and enable the download of the software as a service product.

20. The system of claim 18, wherein the instructions, when executed by the at least one server, cause the system to convert the provisional account associated with the user identifier into the permanent account by:

removing a provisional identifier from the provisional account within the identification system;

associating a permanent identifier with the provisional account within the identification system to create the permanent account; and associating the user credential with the permanent account.

* * * * *